United States Patent
Uetake

(10) Patent No.: US 7,226,699 B2
(45) Date of Patent: Jun. 5, 2007

(54) PROTON CONDUCTOR FILM, MANUFACTURING METHOD THEREFOR, FUEL CELL PROVIDED WITH PROTON CONDUCTOR FILM AND MANUFACTURING METHOD THEREFOR

(75) Inventor: Naoki Uetake, Kanagawa (JP)

(73) Assignee: Sony Corporation, Tokyo (JP)

( * ) Notice: Subject to any disclaimer, the term of this patent is extended or adjusted under 35 U.S.C. 154(b) by 567 days.

(21) Appl. No.: 10/466,649

(22) PCT Filed: Jan. 16, 2002

(86) PCT No.: PCT/JP02/00251

§ 371 (c)(1),
(2), (4) Date: Jul. 17, 2003

(87) PCT Pub. No.: WO02/058177

PCT Pub. Date: Jul. 25, 2002

(65) Prior Publication Data

US 2004/0053102 A1    Mar. 18, 2004

(30) Foreign Application Priority Data

Jan. 19, 2001   (JP)   ............................. 2001-010987
Jan. 19, 2001   (JP)   ............................. 2001-010993
Jan. 19, 2001   (JP)   ............................. 2001-011114

(51) Int. Cl.
*H01M 8/10*   (2006.01)
*H01M 10/40*   (2006.01)
*C08J 5/22*   (2006.01)

(52) U.S. Cl. ................... 429/231.8; 429/306; 429/188; 429/324; 429/33; 429/317; 429/314; 429/316; 521/27

(58) Field of Classification Search ............. 429/231.8, 429/306, 188, 324
See application file for complete search history.

(56) References Cited

U.S. PATENT DOCUMENTS 5,294,732 A * 3/1994 Chiang et al. ................. 560/86
2004/0048127 A1* 3/2004 Shirai et al. ................... 429/33
2004/0062971 A1* 4/2004 Nuber ........................ 429/33

FOREIGN PATENT DOCUMENTS

EP   1063334   12/2000
EP   1 071 149 A2   1/2001

(Continued)

OTHER PUBLICATIONS

H.W. Kroto et al., $C_{60}$: Buckminsterfullerene, Nov. 1985, Nature v. 318, pp. 162-163.

(Continued)

*Primary Examiner*—Patrick Joseph Ryan
*Assistant Examiner*—Angela J. Martin
(74) *Attorney, Agent, or Firm*—Bell, Boyd & Lloyd LLP

(57) ABSTRACT

A proton conductor and film thereof, electrochemical device, such as a fuel cell, employing same and methods of manufacturing same are provided. The proton conductor material film includes a proton conductor and polyvinyl alcohol as a binder for the proton conductor. The proton conductor film develops a high output by an electrode reaction and has superior hydrogen gas intercepting performance.

31 Claims, 16 Drawing Sheets

| | FOREIGN PATENT DOCUMENTS | | | WO | WO 01/06519 | 1/2001 |
|---|---|---|---|---|---|---|
| EP | 1 205 942 A1 | 5/2002 | | | | |
| EP | 1205942 A1 * | 5/2002 | | | | |
| EP | 1 354 864 A1 | 10/2003 | | | | |
| JP | 6-076838 | 3/1994 | | | | |
| JP | 9-194609 | 7/1997 | | | | |
| JP | P2000-256007 | 9/2000 | | | | |
| JP | P2001-32162 | 2/2001 | | | | |
| JP | P2001-35509 | 2/2001 | | | | |

OTHER PUBLICATIONS

Long Y. Chiang et al., *Multi-hydroxy Additions onto $C_{60}$ Fullerene Molecules*, J. Chem. Soc., 1992 pp. 1791-1793.

Long Y. Chiang et al., *Efficient Synthesis of Polyhydroxylated Fullerene Derivatives via Hydrolysis of Polycyclosulfated Precursors*, American Chem. Society, 1994, pp. 3960-3969.

* cited by examiner

US 7,226,699 B2

PROTON CONDUCTOR FILM, MANUFACTURING METHOD THEREFOR, FUEL CELL PROVIDED WITH PROTON CONDUCTOR FILM AND MANUFACTURING METHOD THEREFOR

CROSS REFERENCES TO RELATED APPLICATIONS

The present application claims priority to Japanese Patent Document Nos. P2001-010993 filed on Jan. 19, 2001; P2001-011114 filed on Jan. 19, 2001; and P2001-010987 filed on Jan. 19, 2001, the disclosures of which are herein incorporated by reference.

BACKGROUND OF THE INVENTION

The present invention relates to a proton conductor film, manufacturing method thereof, a fuel cell provided with the proton conductor film, and manufacturing method thereof.

As a high molecular solid electrolyte type fuel cell for automobile driving, there has recently been known such a cell employing a proton (hydrogen ion) conducting high molecular or polymer material, such as perfluorosulfonic acid resin, e.g., a product manufactured by DuPont under the trade name of Nafion®.

Among newer types of the known proton conductors, there are polymolybdenic acids or oxides having a large quantity of hydrated water, such as $H_3Mo_{12}PO_{40} \cdot 29H_2O$ or $Sb_2O_5 \cdot 5.4H_2O$.

When placed in a wetted state, the above-mentioned polymer materials or hydrated compounds exhibit high protonic conductivity at or near the ambient temperature.

Taking an example of the perfluorosulfonic acid resin, protons desorbed from its sulfonic acid groups by electrical dissociation are bonded with the moisture taken in large quantities into the polymer matrix by hydrogen linkage to yield protonated water, that is oxonium ions ($H_3O^+$). The protons then are able to migrate smoothly in the polymer matrix in the form of oxonium ions. Thus, the matrix material of this type exhibits a rather high proton conduction effect even at an ambient temperature. Recently, a proton conductor having a conduction mechanism entirely different from that of the above compounds has recently been developed.

In this regard, a composite metal oxide of a perovskite structure, such as $SrCeO_3$, doped with Yb, has been found to exhibit protonic conductivity, without using the moisture as a movement medium. In this composite metal oxide, it is premeditated that the protons are conducted by channeling, by themselves, through oxygen ions forming the skeleton of the perovskite structure.

These conductive protons are not present from the outset in the composite metal oxide. It may be premeditated that, when this perovskite structure contacts with steam contained in the ambient atmospheric gas, water molecules thereof at a higher temperature react with defective oxygen formed in the perovskite structure on doping to yield protons for the first time by this reaction.

With the above-described various proton conductors, a number of problems exist.

In this regard, a matrix material, such as perfluorosulfonic acid resin, must be continuously placed in a sufficiently wetted state, during use, in order to maintain a high proton conductivity. For example, the conventional proton conductor has a deficiency that its atmosphere dependency is high, such that moisture or steam needs to be supplied, and moreover the operating temperature is excessively high or of a narrow range.

In a system structure of for example a fuel cell, a humidifier or other various ancillary devices are required, thus possibly leading to an increased scale of the system and to increased cost in constructing the system. Moreover, the operating temperature range is not that wide in order to prevent freezing or boiling of the moisture contained in the matrix.

In addition, in the case of the aforementioned composite metal oxide, having the perovskite structure, the operating temperature needs to be maintained at as high as 500° C. or higher in order to achieve meaningful proton conduction.

A need therefore exists to provide improved proton conductors, fuel cells and methods of manufacturing same.

SUMMARY OF THE INVENTION

The present invention provides a proton conductor which is low in temperature dependency, such that it may be used in a wide temperature range inclusive of the ambient temperature, the lower limit temperature is not that high, and moreover moisture is not required regardless of whether or not the proton conductor is used in a mobile medium, and which also has film forming properties and a high strength as well as a gas transmission prohibiting performance.

A proton conductor according to an embodiment of the present invention includes a fullerene derivative including a fullerene molecule and a proton dissociative group introduced to at least one carbon atom of the fullerene molecule and a polyvinyl alcohol in an amount of more than about 20 wt %.

Since the proton conductor of the present invention includes the fullerene derivative and a polyvinyl alcohol in an amount of more than about 20 wt %, protons can be readily dissociated even under a dry condition. Moreover, since the protons are able to exhibit high conductivity over a broad temperature range (at least a range from about 160° C. to a lower use limit temperature of about −40° C. which is not too high in distinction from the case of the conventional complex metal oxide), while exhibiting film forming properties due to the amount of polyvinyl alcohol, the proton conductor of the present invention is increased in strength and prohibits gas transmission so that it may be used as a thin film exhibiting high protonic conductivity.

A method for producing a proton conductor according to an embodiment of the present invention includes a step of introducing proton dissociative groups to carbon atoms of fullerene molecules to generate a fullerene derivative, and a step of mixing the fullerene derivative with polyvinyl alcohol in more than of about 20 wt % and forming the resulting mixture to a thin film.

Since the method for producing a proton conductor according to an embodiment of the present invention includes the step of generating the fullerene derivative and the step of mixing the fullerene derivative with polyvinyl alcohol in more than of 20 wt % and forming the resulting mixture to a thin film, the proton conductor, having the specific properties as described above, can be prepared efficiently as thin film.

An electro-chemical device according to an embodiment of the present invention includes a first electrode, a second electrode and a proton conductor between the first and second electrodes. The proton conductor includes a fullerene derivative including a fullerene molecule and a proton dissociative groups introduced to at least one carbon atom of the fullerene molecule and a polyvinyl alcohol in an amount of more than about 20 wt %.

In the electro-chemical device according to the present invention, in which the proton conductor between the first and second electrodes includes the fullerene derivative and polyvinyl alcohol in an amount of more than about 20 wt %, no humidifying device is required, in contrast to the conventional fuel cell having for example water as a medium for migration. Moreover, the system may be reduced in size and simplified in structure by the thin film of the proton conductor having a high strength and superior gas impermeability.

A proton conductor film according to an embodiment of the present invention, containing the proton conductor and polyvinyl alcohol in an amount of more than about 20 wt %, as its binder, is heated at a temperature of from about 150° C. to about 200° C. This gives a proton conductor film improved in water-proofness and hydrogen gas intercepting performance in which there is no risk of dissolution even on generation of water as a result of the electrode reaction.

The reason why the heating of the proton conductor film, containing the proton conductor and polyvinyl alcohol in an amount of more than about 20 wt %, as its binder, at a temperature of from about 150° C. to about 200° C., is not quite clear. It may be surmised that such heating strengthens the hydrogen bond between a number of hydroxy groups contained in the polyvinyl alcohol to improve crystallinity of polyvinyl alcohol. Apart from the precise grounds, it has been recognized that such heating appreciably lowers the solubility of polyvinyl alcohol in water while appreciably improving water-proofness of the proton conductor film employing polyvinyl alcohol as its binder.

According to the present invention, in which the heating of the proton conductor film, containing the proton conductor and polyvinyl alcohol as its binder, this leads to appreciably lowered solubility of polyvinyl alcohol with respect to water, such a proton conductor film may be obtained in which there is no risk of dissolution even on water generation due to the electrode reaction and which has superior hydrogen gas intercepting performance.

A method for producing a proton conductor film according to an embodiment of the present invention includes heating a proton conductor film at a temperature of about 150° C. to about 200° C., the proton conductor film includes a proton conductor admixed with polyvinyl alcohol and being formed into a film.

According to the present invention, in which the proton conductor film containing the proton conductor and polyvinyl alcohol as a binder for the proton conductor is heated, and the polyvinyl alcohol is lowered appreciably in solubility with respect to water, such a proton conductor film can be produced in which there is no risk of dissolution even on water generation due to the electrode reaction and which has superior hydrogen gas intercepting performance.

A fuel cell according to an embodiment of the present invention includes a hydrogen electrode, an oxygen electrode, and a proton conductor and polyvinyl alcohol, as a binder for the proton conductor, sandwiched between the hydrogen electrode and the oxygen electrode. There is provided a proton conductor film which is heated at a temperature ranging from about 150° C. to about 200° C.

According to the present invention, in which the proton conductor film containing the proton conductor and polyvinyl alcohol as a binder for the proton conductor is heated, and in which the polyvinyl alcohol is lowered appreciably in solubility with respect to water, there may be provided a high output fuel cell which has a proton conductor film in which there is no risk of dissolution even on water generation due to the electrode reaction and which has superior hydrogen gas intercepting performance.

A method for producing fuel cell according to an embodiment of the present invention includes sandwiching a proton conductor film between a hydrogen electrode and an oxygen electrode, the proton conductor film containing a proton conductor and polyvinyl alcohol as a binder for the proton conductor. The method for producing fuel cell includes a step of heating the proton conductor film at a temperature of about 150° C. to about 200° C.

According to the present invention, in which the proton conductor film containing the proton conductor and polyvinyl alcohol as a binder for the proton conductor is heated, and in which the polyvinyl alcohol is lowered appreciably in solubility with respect to water, a high output fuel cell having a proton conductor film may be provided, in which there is no risk of dissolution even on water generation due to the electrode reaction and which has superior hydrogen gas intercepting performance.

A proton conductor film according to an embodiment of the present invention includes a layer of a proton conductor containing a fullerene derivative and a hydrogen gas intercepting layer composed of a fullerene derivative admixed with polyvinyl alcohol.

According to the present invention, since the hydrogen gas may be reliably prohibited from reaching the oxygen electrode, it is possible to prevent the hydrogen gas from reaching the oxygen electrode to impede the electrode reaction on the oxygen electrode to lower the fuel cell output.

A fuel cell according to an embodiment of the present invention includes hydrogen electrode, an oxygen electrode, and a proton conductor film between the hydrogen electrode and the oxygen electrode. The proton conductor film includes a proton conductor layer containing a fullerene derivative and a hydrogen gas intercepting layer composed of the fullerene derivative admixed with polyvinyl alcohol.

According to the present invention, it is possible to positively prohibit the hydrogen gas from reaching the oxygen electrode, so that it is possible to effectively prevent the hydrogen gas from reaching the oxygen electrode to impede the electrode reaction on the oxygen electrode to lower the fuel cell output.

According to the present invention, any optional material having the ability of proton conduction can be used as a proton conductor. However, from the perspective of not necessitating humidification, fullerene derivatives, such as fullerenol, are preferably employed.

As used herein, the term "fullerene derivatives" and/or other like terms means carbon atoms of fullerene molecules, to which the proton dissociative groups are introduced.

As used herein, the term "proton dissociation" and/or other like terms means proton desorption due to electrical dissociation, while the term "proton dissociative groups" and/or other like terms denotes groups from which protons may be desorbed on electrical dissociation.

According to the present invention, there is no particular limitation to the fullerene molecules, to which the proton dissociative groups are introduced, it being sufficient if the fullerene molecules, to which the proton dissociative groups are introduced, are spheroidal carbon cluster molecules. However, fullerene molecules, such as $C_{36}$, $C_{60}$, $C_{70}$, $C_{76}$, $C_{78}$, $C_{80}$, $C_{82}$, $C_{84}$ and the like, are preferably used either singly or as a mixture.

According to the present invention, the proton dissociative groups in an embodiment are those preferably represented by —XH, where X is any bivalent atom or atom group thereof and wherein H is a hydrogen atom.

According to the present invention, the proton dissociative groups in an embodiment are those preferably represented by —OH or —YOH, where Y is a bivalent atom or atom group thereof and wherein H is a hydrogen atom.

According to the present invention, the proton dissociative groups in an embodiment include, for example, —OH, —OSO$_3$H, —COOH, —SO$_3$H and —OPO(OH)$_2$ and/or the like. Typical of the fullerene derivatives are fullerene polyhydroxide and fullerenol in the form of a hydrogen sulfate ester.

According to the present invention, the fullerene derivatives in an embodiment are preferably those in which electrophilic groups are introduced, along with proton dissociative groups, into carbon atoms of fullerene molecules thereof. The electrophilic groups include, for example a nitro group, a carbonyl group, a carboxylic group, a nitrile group, a halogenated alkyl group and halogen atoms, such as fluorine or chlorine atoms, the like and combinations thereof.

According to the present invention, the number of the proton dissociative groups introduced to the carbon atoms of the fullerene molecule may be optionally determined within the range of the number of the carbon atoms of the fullerene molecule. It is, however, preferably five or more in an embodiment. In order to leave π-electricity of fullerene intact to manifest effective electrophilicity, the number of the proton dissociative groups is desirably not larger than one half the number of the carbon atoms of the fullerene molecule.

Additional features and advantages of the present invention are described in, and will be apparent from, the following Detailed Description of the Invention and the figures.

DETAILED DESCRIPTION OF THE INVENTION

The present invention generally relates to proton conductors, films thereof, electro-chemical devices, such as fuel cells, that employ same and methods of manufacturing same. The present invention is now explained with reference to certain preferred embodiments thereof.

Figure 1B:
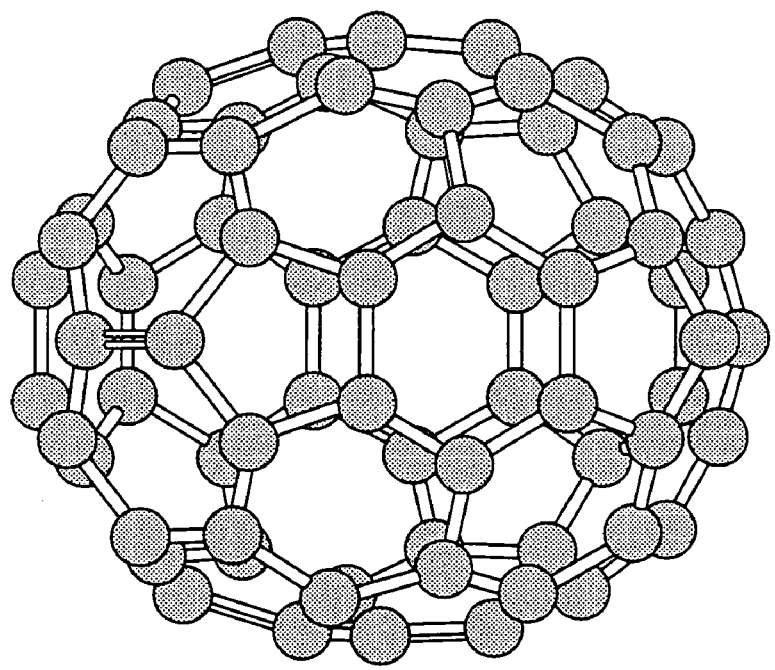
FIGS. 1A and 1B illustrate the structure of fullerene molecules according to an embodiment of the present invention.
Figure 1A:
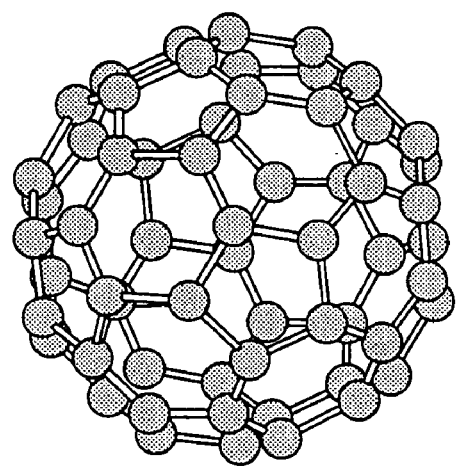

In a proton conductor, a manufacturing method therefor and an electrochemical device, according to the present invention, any spheroidal cluster molecules may be used, without limitations, as fullerene molecules, operating as a matrix into which the proton dissociative groups are introduced. In an embodiment, fullerene molecules $C_{36}$, $C_{60}$ (see FIG. 1A), $C_{70}$ (see FIG. 1B), $C_{76}$, $C_{78}$, $C_{80}$, $C_{82}$ and $C_{84}$, used either singly or in combination.

These fullerene molecules were found in 1985 in a mass analysis spectrum of a cluster beam by laser ablation of carbon (Kroto, H. W.; Heath, J. R.; O'Brien, S. C.; Curl, R. F.; Smalley, R. E. Nature 1985.318, 162). The manufacturing method was actually established five years later or in 1990 when the manufacturing method by an arc discharge method of a carbon electrode was found. Since that time, fullerene attracted attention as a carbonaceous semiconductor material.

The present inventors have conducted research related to proton conductivity of the derivatives of the fullerene molecules and found that fullerene polyhydroxide, obtained on introducing hydroxy groups into constituent carbon atoms of fullerene, shows a high proton conductivity over a wide temperature range on both sides of the ambient temperature, that is a temperature range including water freezing point or a water boiling point, at least a temperature range from about 160° C. to about −40° C., even under a dry condition. It was also found that this proton conductivity becomes more pronounced when hydrogen sulfate (ester) groups are introduced in place of hydroxy groups into the constituent carbon atoms of fullerene.

Figure 2B:
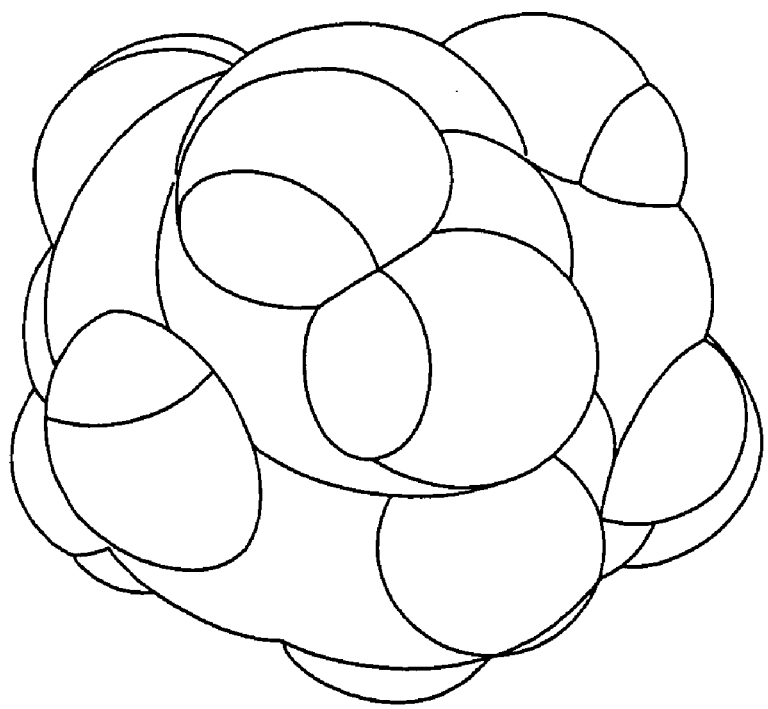
FIGS. 2A and 2B illustrate the structure of fullerene polyhydroxide according to an embodiment of the present invention.
Figure 2A:
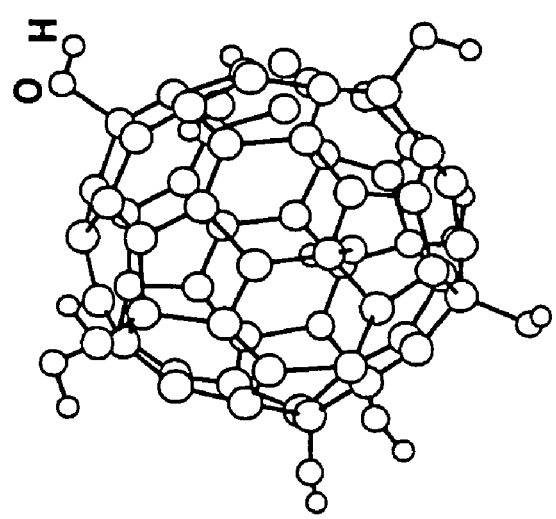

More specifically, fullerene polyhydroxide is a general term that describes a compound composed of fullerene and a number of hydroxy groups bonded thereto, as shown in FIGS. 2A and 2B, and is commonly termed "fullerenol". As a matter of course, several variations are possible as to the number of hydroxy groups or the disposition thereof in the molecule. As for this fullerenol, a first synthesis example was reported by Chiang et al. In 1992 (Chiang, L. Y.; Swirczewski, J. W.; Hsu, C. S.; Chowdhurry, S. K.; Cameron, S.; Creegan, K. J. Chem. Soc. Chem. Commun, 1992, 1791). Since that time, fullerenol into which are a quantity in excess of a certain quantity of hydroxy groups has stirred up notice in particular as to its being water-soluble, and investigated mainly in the bio-related technical field.

Figure 3A:
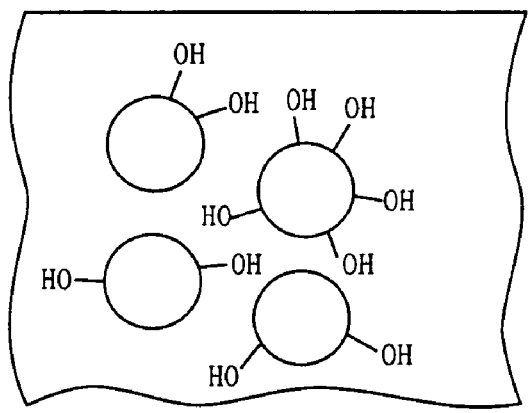
FIGS. 3A to 3C are schematic views showing another example of a fullerene derivative according to an embodiment of the present invention.

The present inventors rendered such fullerenol a flocculated product, in order to produce interaction between hydroxy groups of fullerene molecules (indicated by ○ in FIG. 3) neighboring to each other, as schematically shown in FIG. 3A, and was the first to find that this flocculated product exhibit high proton conductivity characteristics, in other words, high desorbing properties of $H^+$ from the phenolic hydroxy groups of the fullerene molecules, as a macroscopic aggregate.

Figure 3B:
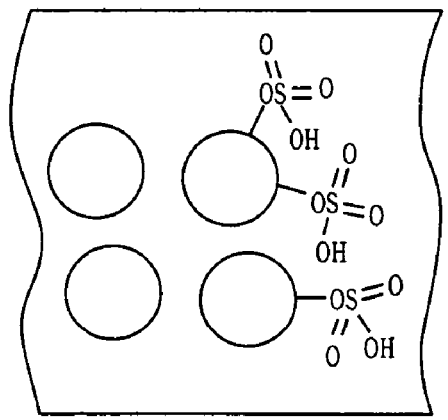

In an embodiment, the present invention can include, as a proton conductor, the flocculated fullerene having a number of —$OSO_3H$ groups, in addition to fullerenol. Reports on fullerene polyhydroxide, in which the —$OSO_3H$ groups are substituted for OH groups, as shown in FIG. 3B, that is hydrogen sulfate fullerenol (ester), were similarly made by Chiang et al. In 1994 (Chiang L. Y.; Wang, L. Y.; Swirczewski, J. W.; Soled, S.; Cameron, S. J. Org. Chem. 1994, 59, 3960). In a certain hydrogen sulfate fullerene (ester) molecule, only a number of —$OSO_3H$ groups may be contained in one molecule, or a number of these groups and a plural number of hydroxy groups may be contained in the fullerene molecule.

As for the protonic conductivity exhibited by these derivatives as a bulk material when a large number of the aforementioned fullerene derivatives are flocculated together, the large quantity of hydroxy groups, contained from the outset in the molecules, and protons derived from the —$OSO_3H$ groups, directly take part in migration, so that it is unnecessary to take hydrogen or protons, derived from steam molecules, from atmosphere, or to have the moisture replenished or absorbed from outside, in particular from outside air. That is, there are no limitations on the atmosphere. It may be contemplated that fullerene as the matric material of these derivative molecules exhibits electrophilic properties, which possibly contributes appreciably to promotion of electrical dissociation of hydrogen ions in e.g., the hydroxy groups. In this regard, the proton conductors of the present invention are believed to exhibit superior protonic conductivity.

Moreover, since a rather large number of hydroxy groups and $OSO_3H$ groups can be introduced into one fullerene molecule, the number density per unit volume of the proton conductor taking part in conduction is extremely large. This is also believed to contribute to an effective conduction ratio displayed by the proton conductor of the present invention.

A substantial amount of the proton conductor of the present invention in an embodiment include fullerene carbon molecules, so that the proton conductor is lightweight and insusceptible to transmutation, while being free of pollutants. Moreover, the production cost of fullerene is being lowered acutely. In the perspective of resources, environment or economy, fullerene can be regarded as a near-ideal carbonaceous material as compared to any other materials.

The present inventors have recognized that the proton dissociative groups need not necessarily be the aforementioned hydroxy groups or to —$OSO_3H$ groups.

In this regard, the dissociative groups in an embodiment are represented by —XH, where X may be any optional bivalent atom or atom groups. Therefore, the dissociative groups in an embodiment are represented by —OH or —YOH, where Y may be any optional bivalent atom or atom groups thereof.

Preferably, the proton dissociative groups can include —COOH, —$SO_3H$, —$OPO(OH)_2$, in addition to the aforementioned —OH or —$OSO_3H$ and combinations thereof.

Figure 3C:
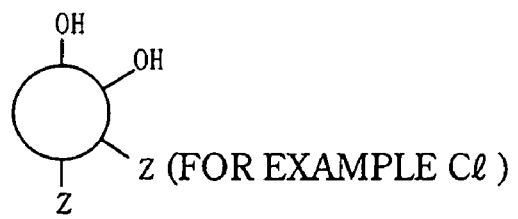

According to an embodiment of the present invention, electrophilic groups, such as nitro-, carbonyl-, carboxyl-, nitrile- or halogenated alkyl groups, or halogen atoms, such as fluorine or chlorine atoms, the like and combinations thereof are desirably introduced to carbon atoms of a fullerene molecule. FIG. 3C shows a fullerene molecule to which Z has been introduced in addition to —OH, where Z is, for example, —$NO_2$, —CN, —F, —Cl, —COOR, —CHO, —COR, —$CF_3$ or —$SOCF_3$, where R denotes an alkyl group and the like. If the electrophilic groups co-exist, protons are more liable to be desorbed from the proton dissociative groups due to the electrophilic properties of the electrophilic groups.

According to an embodiment of the present invention, the number of the proton dissociative groups introduced to the fullerene molecule may be any optional number within the range of the number of carbon atoms of the fullerene molecule, and desirably not less than five. Meanwhile, in order to retain 7r-electron properties and to manifest efficacious electrophilicity of fullerene, the number of the above groups is preferably not larger than one half the number of carbon atoms making up the fullerene.

For synthesizing the fullerene derivative used in the proton conductor of the present invention, powders of the aforementioned fullerene molecules may be subjected to an optional combination of known processing operations, such as acid processing or hydrolysis, to introduce desired proton dissociative groups to the constituent carbon atoms of the fullerene molecules.

According to an embodiment of the present invention, the powders of the fullerene derivative, thus obtained, may be pressure-molded to a desired shape, such as to a pellet. Since no binder is needed in this case, it is possible to increase protonic conductivity and to achieve the light weight of the proton conductor.

The proton conductor of the present invention can be used with advantage to a variety of electro-chemical devices. That is, in a basic structure that includes first and second electrodes and the proton conductor sandwiched in-between these electrodes, the proton conductor of the present invention may be exploited with advantage as the interposed proton conductor.

Specifically, the proton conductor of the present invention may be applied with advantage to an electro-chemical device where the first and/or second electrodes is a gas electrode or to an electro-chemical device where the first and/or second electrodes is an electrode of an active material.

An embodiment of the present invention where the inventive proton conductor is used as a fuel cell is now explained.

Figure 4:
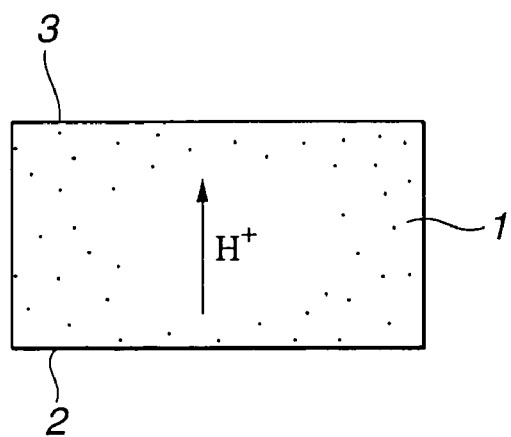
FIG. 4 is a schematic view showing an example of a proton conductor according to an embodiment of the present invention.

The proton conduction in the fuel cell occurs as shown in the schematic view of FIG. 4. That is, a proton conduction unit 1 is sandwiched or positioned between a first electrode (such as a hydrogen electrode) 2 and a second electrode (such as an oxygen electrode) 3, with the desorbed protons migrating from the first electrode 2 towards the second electrode 3 in a direction indicated by arrow in the drawing.

Figure 5:
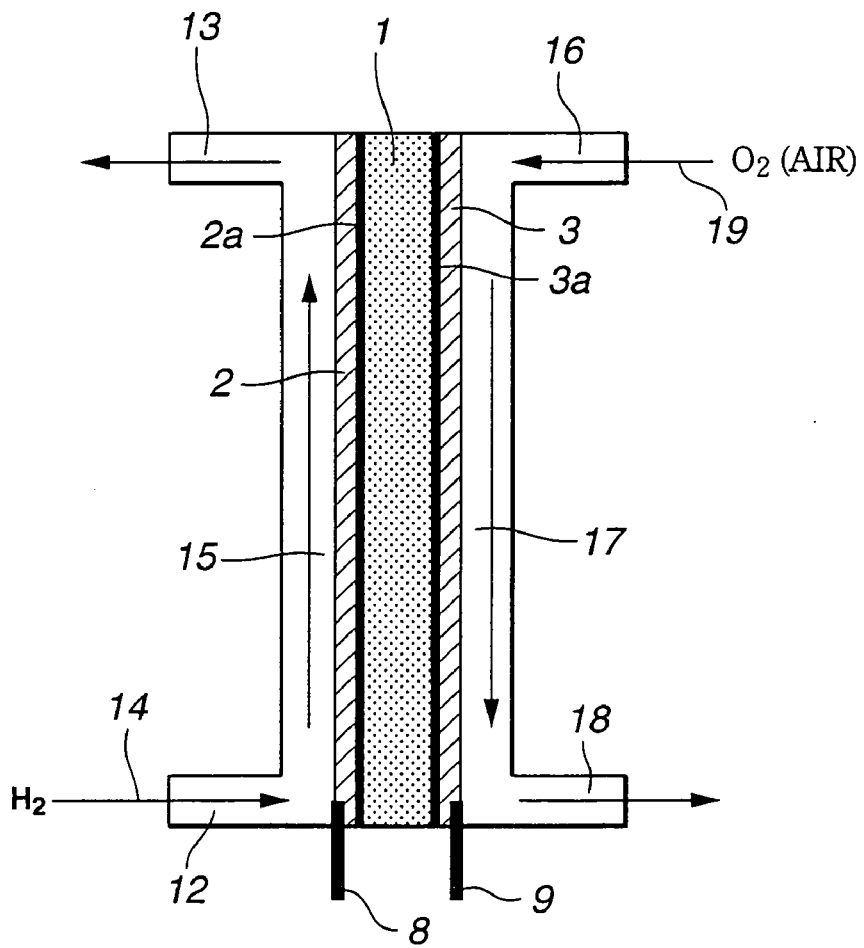
FIG. 5 illustrates a structure of a fuel cell according to an embodiment of the present invention.

FIG. 5 shows a specified embodiment of a fuel cell employing a proton conductor of the present invention.

This fuel cell includes an anode (fuel electrode or hydrogen electrode) and a cathode (oxygen electrode) 3 facing each other and fitted with terminals 8, 9, respectively. On the anode and the cathode, catalysts 2a, 3a are bonded tightly or scattered, respectively. In-between these electrodes is sandwiched the proton conduction unit 1. In use, hydrogen is supplied from an inlet 12 on the anode 2 so as to be discharged at an outlet 13, which may optionally be omitted. As a fuel ($H_2$) 14 is passed through a flow duct 15, protons are produced to migrate towards the cathode 3 along with protons produced in the proton conduction unit 1, and are reacted with oxygen (air) 19 supplied via inlet 16 to a flow duct 17 so as to be moved towards the outlet 18, thus generating the desired electromotive force.

In the fuel cell of the above structure, the protons supplied from the anode 2 are moved towards the cathode 3, as protons are dissociated in the proton conduction unit 1. Thus, the fuel cell of the above-described structure features a high protonic conductivity. Since no humidifying equipment is needed, it is possible to realize a simplified and lightweight system.

Moreover, in distinction from the proton conductor, composed only of a fullerene derivative, the proton conductor of the present invention is afforded with film forming properties, innate to polyvinyl alcohol, such that, as compared to a proton conductor obtained on compression molding the powders of the aforementioned fullerene derivative, the proton conductor of the present invention may be used as a pliable proton conducting thin film (such as, about 300 μm or less in thickness) high in strength and which has a gas transmission prohibiting performance. In addition to polyvinyl alcohol, such a compound which prohibits protonic conductivity by, for example, a reaction with the fullerene derivative to the least extent possible and which exhibits film-forming properties may be used. However, such a compound not exhibiting electronic conductivity and exhibiting optimum stability may usually be employed. Specified examples of such compound include polyfluoroethylene, polyvinylidene fluoride the like and suitable combinations thereof.

A thin film of the proton conductor of the present invention may be formed by any suitable known film-forming means, such as extrusion molding or the like.

Figure 6:
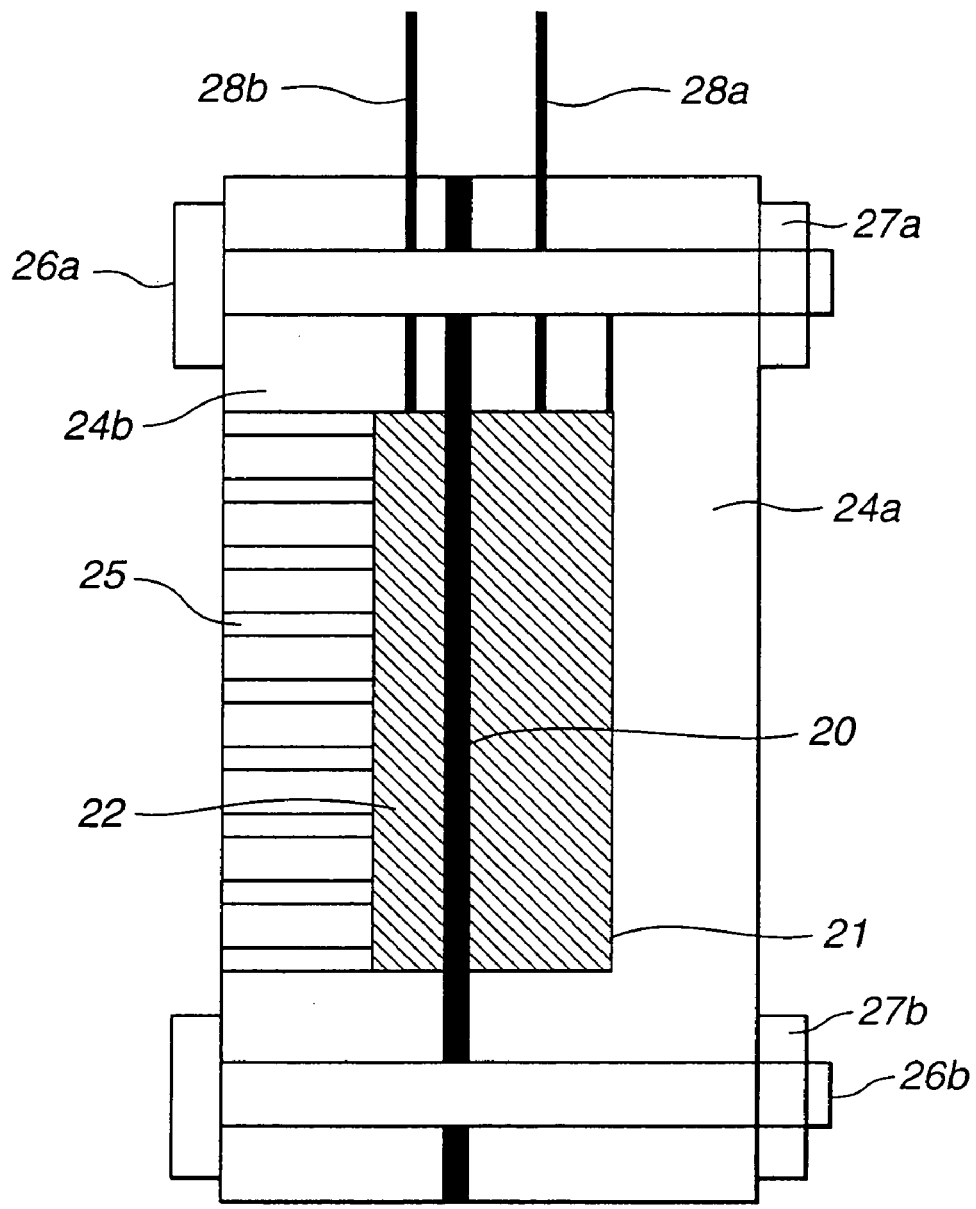
FIG. 6 illustrates a structure of a hydrogen-air cell according to another embodiment of the present invention.

For example, a hydrogen-air cell shown in FIG. 6 may be obtained by arranging a hydrogen electrode 21 and an air electrode 22 facing each other with a proton conduction unit 20 in-between, sandwiching the resulting assembly by a Teflon plate 24a and a Teflon plate 24b having numerous openings 25, and securing the resulting product by bolts 26a, 26b and nuts 27a, 27b. From the above electrodes, a hydrogen electrode lead 28a and an air electrode lead 28b are derived to outside.

Figure 7:
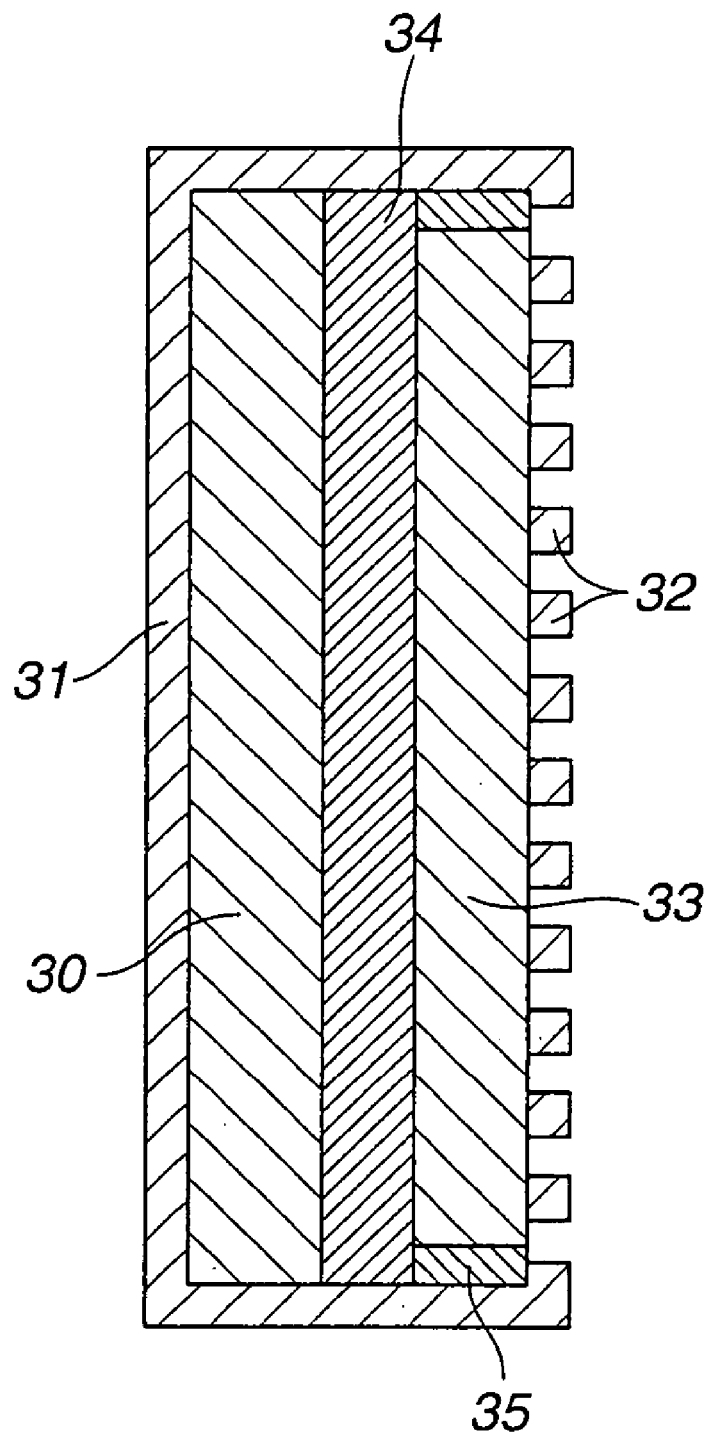
FIG. 7 illustrates a schematic structure of an electro-chemical device according to still another embodiment of the present invention.

An electro-chemical device, shown in FIG. 7, a proton conduction unit 34 is sandwiched between an anode 31, carrying a layer of anode active material 30 on its inner surface, and a cathode 33 (gas electrode), carrying a gas transmission supporting member 32 on its outer surface. The proton conduction unit of the present invention is used as the proton conduction unit 34. As the anode active material, such a material comprised of a hydrogen occluding alloy or of a carbon material, such as fullerene, carrying a hydrogen occluding alloy, is preferred. As the gas transmission supporting member 32, a porous carbon paper sheet, for example may be used. As the cathode 3, it is desirable to coat and form a material comprised of platinum carried by carbon powders. Meanwhile, a gap between the outer end of the anode 31 and the outer end of the cathode 33 is closed by a gasket 35. In this electro-chemical device, a sufficient quantity of the moisture is caused to be present on the cathode 33 to effect charging.

Figure 8:
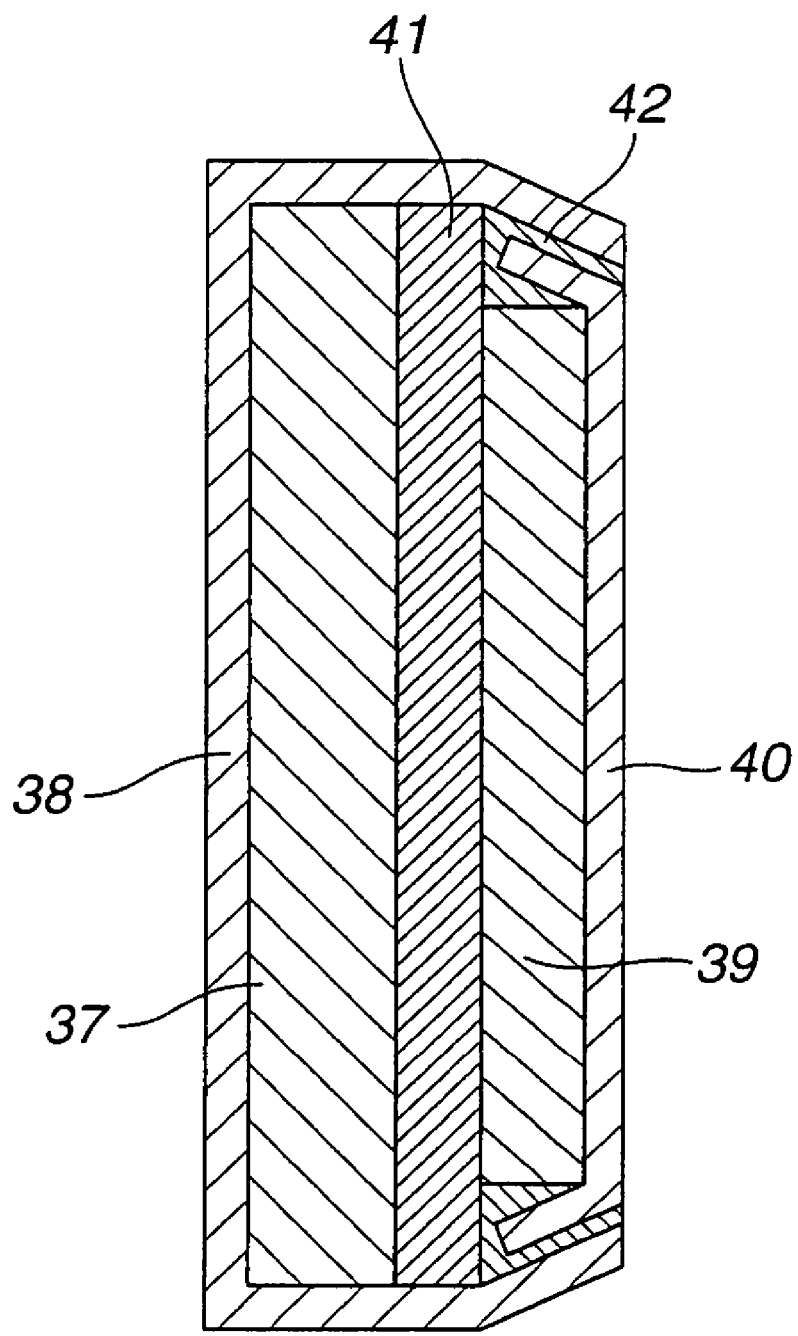
FIG. 8 illustrates a schematic structure of an electro-chemical device according to a further embodiment of the present invention.

In the electro-chemical device, shown in FIG. 8, a proton conductor 41 in the form of a thin film is sandwiched between an anode 38 having a layer of an anode active material 37 on its inner surface and a cathode 40 having a layer of a cathode active material 39 on its inner surface. In an embodiment, the cathode active material is composed mainly of, for example, nickel hydroxide. In the present electro-chemical device, the gap between the outer end of the anode 38 and the outer end of the cathode 40 is again closed by a gasket 42.

Each of the above-described electro-chemical device, the proton conduction effect can be displayed by a mechanism similar to that of the electro-chemical device shown in FIG. 5. Moreover, since the proton conductor uses the fullerene derivative with the film-forming polyvinyl alcohol, the proton conductor can be used as a thin film having improved strength and exhibiting low gas transmitting properties and hence is able to display superior protonic conductivity.

In the present embodiment, the conductor film includes a fullerene derivative, having carbon atoms which form fullerene molecules and proton ($H^+$) dissociative groups introduced to the carbon atoms and polyvinyl alcohols in a amount not less than about 20 wt % and not larger than about 40 wt % in the perspective of the voltage or current dependency of the fuel cell output, the PVA content preferably exceeds about 20 wt % and is preferably about 25 wt %. The upper limit of the PVA content is preferably about 40% by weight, more preferably about 37 wt % or about 35 wt %.

As a binder mixed into fullerenol, other high molecular or polymer material, such as polyfluoroethylene, may be used in addition to PVA, on the condition that the PVA content exceeds about 20 wt %.

The proton conductor film of the present invention in an embodiment may be formed into a sheet or other suitable shape and may also be applied to hydrogen synthesis besides the fuel cell.

Moreover, according to an embodiment of the present invention, a hydrogen intercepting layer, that includes a fullerene derivative admixed with polyvinyl alcohol, is formed on at least one surface of the proton conductor layer containing the fullerene derivative.

According to an embodiment of the present invention, a hydrogen intercepting layer, that includes a fullerene derivative admixed with polyvinyl alcohol, is formed on at least the surface towards the oxygen electrode of the proton conductor layer containing the fullerene derivative.

According to an embodiment of the present invention, a hydrogen intercepting layer, that includes a fullerene derivative admixed with polyvinyl alcohol, is formed on at least the surface towards the hydrogen electrode of the proton conductor layer containing the fullerene derivative.

In the present invention, the hydrogen intercepting layer, that includes the fullerene derivative admixed with polyvinyl alcohol, is preferably about 0.1 μm to about 10 μm in thickness. If the thickness of the hydrogen intercepting layer, that includes the fullerene derivative admixed with polyvinyl alcohol, is less than about 0.1 μm, a sufficient hydrogen gas intercepting performance cannot be exhibited. If conversely the thickness of the hydrogen intercepting layer exceeds about 10 μm, the resistance value of the proton conductor film in its entirety is undesirably increased to cause the fuel cell output to be lowered.

In the present invention, the fullerene derivative to polyvinyl alcohol mixing weight ratio in the hydrogen intercepting layer, that includes the fullerene derivative admixed with polyvinyl alcohol, depends on the type of the fullerene derivative, and is preferably 6:4 to 9:1, in case of using a hydrogen sulfate ester fullerenol as a fullerene derivative.

According to the present invention in an embodiment, the proton conductor film, containing a proton conductor and the polyvinyl alcohol, as its binder, needs to be heated at a temperature of about 150° C. to about 200° C. If this processing temperature exceeds about 200° C., the polyvinyl alcohol as the binder tends to be transmuted, whereas, if the processing temperature is lower than about 150° C., the water proofness of the proton conductor film, employing polyvinyl alcohol as the binder, cannot be improved within a practical processing time.

In the present invention, the proton conductor film, containing the proton conductor and the polyvinyl alcohol, as its binder, is heated at a temperature preferably from about 160° C. to about 200° C.

In the present invention, the thickness of the proton conductor film, containing the proton conductor and the polyvinyl alcohol, as its binder, is preferably about 0.1 to about 20 µm, depending on the type of the proton conductor. If the thickness of the proton conductor film, containing the proton conductor and the polyvinyl alcohol, as its binder, is less than about 0.1 µm, it is not possible to achieve sufficient hydrogen gas intercepting performance, whereas, if the thickness of the proton conductor film, containing the proton conductor and the polyvinyl alcohol, as its binder, exceeds about 20 µm, the resistance value of the proton conductor film in its entirety is undesirably increased to cause the fuel cell output to be lowered.

If, in the present invention, a fullerene derivative is used as a proton conductor, it is preferred that the fullerene derivative and polyvinyl alcohol are mixed at a weight ratio of 60:40 to 95:5, depending on the type of the fullerene derivative, to form the film of the fullerene derivative.

Although there is no particular limitation to the method of forming the proton conductor film, it may be formed by any of a variety of coating methods, such as a bar coating method, a spin coating method or a doctor blade method, a variety of printing methods, such as screen printing or gravure printing, or a spray-drying method.

If the printing method is used, and the fullerene derivative is used as the proton conductor, a mixture of the fullerene derivative and polyvinyl alcohol is dispersed or dissolved in an amount by weight of water equal to one to ten times as much as that of the mixture of the fullerene derivative and polyvinyl alcohol and printed. After printing, the water, as solvent, is vaporized off to form a proton conductor film. If the organic solvent is used, an organic solvent, such as methanol, ethanol or isopropyl alcohol, or a mixed solvent, composed of these organic solvents and water, is preferably used. After printing, the solvent is vaporized off to form the proton conductor film.

In an embodiment of the present invention, a layer of a proton conductor not containing polyvinyl alcohol is formed on both sides of the proton conductor film.

In a preferred embodiment of the present invention, a layer of the proton conductor not containing polyvinyl alcohol is formed on both sides of the proton conductor film, and is sandwiched by an oxygen electrode and a hydrogen electrode, composed mainly of carbon, to form a fuel cell.

While polyvinyl alcohol is water-soluble, the oxygen electrode and the hydrogen electrode, mainly composed of carbon, are water-repellent. Thus, if the proton conductor film, employing polyvinyl alcohol as a binder, is to be directly tightly contacted with the hydrogen and oxygen electrodes, contact tightness is only poor, such that the fuel cell output is likely to be lowered. In a preferred embodiment of the present invention, in which the layers of the proton conductor not containing the polyvinyl alcohol are formed on both surfaces of the proton conductor film, contact tightness between the hydrogen and oxygen electrodes and the proton conductor film can be improved appreciably, thus realizing a high output fuel cell.

The layer of the proton conductor not containing polyvinyl alcohol is preferably about 5 µm to about 20 µm in thickness. If the thickness of the layer of the fullerene derivative not containing polyvinyl alcohol is less than about 5 µm, contact tightness with the hydrogen and oxygen electrodes, composed mainly of carbon, cannot be improved sufficiently, whereas, if the thickness of the layer of the proton conductor not containing polyvinyl alcohol exceeds about 20 µm, the resistance value of the proton conductor film in its entirety is undesirably increased to cause the fuel cell output to be lowered.

Although there is no particular limitation to the method of forming the proton conductor film, not containing polyvinyl alcohol, it may be formed by any of a variety of coating methods, such as a bar coating method, a spin coating method or a doctor blade method, a variety of printing methods, such as screen printing or gravure printing, or a spray-drying method. If the printing method is used, the fullerene derivative is dispersed or dissolved in an amount of an organic solvent, such as tetrahydrofuran, acetonitrile, dimethylacetoamide, dimethylformamide or N-methylpyrrolidone, equal to one to ten times by weight as much as that of the fullerene derivative, and printed. After printing, the solvent is vaporized off to form a fullerene derivative layer not containing polyvinyl alcohol.

According to an embodiment of the present invention, the proton conductor film contains a fullerene derivative and polyvinyl alcohol. There is also provided a hydrogen gas intercepting layer that includes the fullerene derivative admixed with polyvinyl alcohol.

According to an embodiment of the present invention, it has been confirmed that, by providing the hydrogen gas intercepting layer composed of the fullerene derivative admixed with polyvinyl alcohol, to the proton conductor film, the hydrogen gas intercepting performance of the proton conductor film can be improved appreciably.

According to an embodiment of the present invention, it is sufficient if there is provided a hydrogen gas intercepting layer composed of the fullerene derivative admixed with polyvinyl alcohol, irrespective of the position for forming the hydrogen gas intercepting layer.

According to an embodiment of the present invention, the hydrogen gas intercepting layer, composed of the fullerene derivative admixed with polyvinyl alcohol, is formed on at least one surface of the proton conductor film containing the fullerene derivative. It should be noted that the hydrogen gas intercepting layer, composed of the fullerene derivative admixed with polyvinyl alcohol, may be formed on the surface towards the oxygen electrode of the proton conductor film or on the surface towards the hydrogen electrode of the proton conductor film.

According to an embodiment of the present invention, the hydrogen gas intercepting layer is formed to a thickness of about 0.1 to about 10 µm. If the thickness of the hydrogen gas intercepting layer, composed of the fullerene derivative admixed with polyvinyl alcohol, is less than about 0.1 µm, it is not possible to realize sufficient hydrogen gas intercepting performance, whereas, if the thickness exceeds about 10 µm, the resistance value of the proton conductor film in its entirety is undesirably increased to cause the fuel cell output to be lowered. The mixing ratio by weight of the fullerene derivative to polyvinyl alcohol in the hydrogen gas intercepting layer, composed of the fullerene derivative admixed with polyvinyl alcohol, is preferably 6:4 to 9:1, in case of employing hydrogen sulfate ester furalenol as the fullerene derivative. This mixing ratio is varied depending on the type of the fullerene derivative used.

Although there is no particular limitation to the method for forming the hydrogen gas intercepting layer, composed of the fullerene derivative admixed with polyvinyl alcohol, it may be formed by a variety of coating methods, such as a bar coating method, a spin coating method or a doctor blade method, a variety of printing methods, such as screen printing or gravure printing, or a spray-drying method. If the printing method is used, the mixture of the fullerene derivative and polyvinyl alcohol is dispersed or dissolved in an amount of water equal to one to ten times by weight as much as that of the mixture of the fullerene derivative and polyvinyl alcohol, and printed. After printing, the water as solvent is vaporized off to form the hydrogen gas intercepting layer, composed of the fullerene derivative admixed with polyvinyl alcohol.

According to an embodiment of the present invention, a layer of the proton conductor not containing polyvinyl alcohol is formed on the surface of the hydrogen gas intercepting layer, composed of the fullerene derivative admixed with polyvinyl alcohol.

According to an embodiment of the present invention, the heating of the proton conductor film may be carried out at any time following the deposition of the proton conductor film.

The heating may be carried out after forming the proton conductor film on the oxygen electrode or the hydrogen electrode, formed mainly of carbon. Alternatively, the heating may be carried out after forming a proton conductor film on the oxygen electrode or the hydrogen electrode, formed mainly of carbon, and tightly contacting the oxygen electrode or the hydrogen electrode on the proton conductor film surface.

For forming the layer of the fullerene derivative not containing polyvinyl alcohol, it is possible to form a layer of the fullerene derivative, not containing polyvinyl alcohol, on the oxygen electrode or the hydrogen electrode, formed mainly of carbon, to form a proton conductor film thereon, and to then effect the heating. It is also possible to form a layer of the fullerene derivative not containing polyvinyl alcohol on the oxygen electrode or the hydrogen electrode, formed mainly of carbon, to form a proton conductor film thereon, to form a layer of a fullerene derivative not containing polyvinyl alcohol on the surface of the proton conductor film, to contact the oxygen or hydrogen electrode tightly with the layer of the fullerene derivative not containing polyvinyl alcohol, and to then effect the heating.

For providing the hydrogen intercepting layer, admixed with polyvinyl alcohol, on the layer of the fullerene derivative, the hydrogen intercepting layer is first formed to then effect the heating.

It is also possible to effect the heating solely of the proton conductor film as formed.

There is no particular limitation to the methods for heating the proton conductor film. For example, a method of setting a proton conductor film or a layered product, including the proton conductor film, on a heater, and heating the proton conductor film or the layered product, a method of directly pressuring a heater onto the proton conductor film to heat it (hot press method), a method of charging a proton conductor film or a layered product, including the proton conductor film, into a constant temperature vessel, and heating the proton conductor film or the layered product, or a method of blowing a gas, containing heated air or a heated gas, such as heated nitrogen or argon, onto a proton conductor film or a layered product, including the proton conductor film, to effect heating, the like can be used according to an embodiment of the present invention.

The heating of the proton conductor film or the layered product, including the proton conductor film, may be carried out in an atmosphere of inert gases, such as argon or nitrogen, or in outside air, the like and suitable mixtures thereof.

The present invention is now explained in detail, without limitations, with reference to Examples.

<Synthesis of Fullerene Polyhydroxide>

This synthesis was carried out by having reference to a reference material (Chiang, L. Y.; Wang, L. Y.; Swirczewski, J. W.; Soled, S.; Cameron, S. J. Org. Chem. 1994, 59, 3960). 2 g of powders of a $C_{60}/C_{70}$ fullerene mixture, containing approximately 15% of $C_{70}$, were charged into 30 ml of fuming sulfuric acid and stirred for three days in a nitrogen atmosphere maintained at 57° C. The resulting reaction product was charged gradually into anhydrous diethyl ether, and cooled in a glacial bath. The resulting precipitates were fractionated on centrifugation, washed thrice with diethyl ether and twice with a 2:1 liquid mixture of diethyl ether and acetonitrile, and dried at 40° C. under reduced pressure. The resulting dried product was charged into 60 ml of ion exchanged water and stirred for ten hours under bubbling with nitrogen at 85° C. The reaction product was then freed on centrifugation from precipitates which were further washed several times with pure water. After repeated centrifugation, the resulting product was dried at 40° C. under reduced pressure. The resulting brownish powders were subjected to FT-IR measurement. It was found that the IR spectrum of the brownish powders substantially coincided with that of $C_{60}(OH)_{12}$ indicated in the above reference material, such that the powders could be identified to fullerene polyhydroxide as a target substance.

<Manufacture of Flocculated Fullerene Polyhydroxide>

90 mg of these powders of fullerene polyhydroxide were taken and pressed unidirectionally to form a circular pellet 15 mm in diameter. The pressing pressure at this time was approximately 7 ton/cm². It was found that these powders of fullerene polyhydroxide were superior in moldability, despite the fact that they were completely free of e.g., a binder resin, and could be readily formed into a pellet. This pellet, approximately 300 µm in thickness, is a pellet of Example 1.

<Synthesis 1 of Fullerene Polyhydroxide Hydrogensulfate (Full Ester)>

This synthesis was conducted by having reference to the above-mentioned reference material. 1 g of powders of fullerene polyhydroxide was charged into 60 ml of fuming sulfuric acid and stirred at room temperature for three days in a nitrogen atmosphere. The resulting reaction product was charged gradually into anhydrous diethyl ether and cooled in a glacial bath. The resulting precipitates were fractionated on centrifugation, washed thrice with diethyl ether and twice with a 2:1 liquid mixture of diethyl ether and acetonitrile, and dried at 40° C. under reduced pressure. The resulting powders were subjected to FT-IR measurement. It was found that the IR spectrum of the powders substantially coincided with that of fullerene polyhydroxide, all hydroxy groups of which were replaced by hydrogen sulfate, as indicated in the above reference material, such that the powders could be identified to be a target substance.

<Manufacture of Flocculated Pellet of Fullerene Polyhydroxide Hydrogensulfate (Ester)>

70 mg of these powders of fullerene polyhydroxide hydrogensulfate (ester) were taken and pressed unidirectionally to form a circular pellet 15 mm in diameter. The pressing pressure at this time was approximately 7 ton/cm$^2$. It was found that these powders of fullerene polyhydroxide were superior in moldability, and could be readily formed into a pellet, despite the fact that they were completely free of e.g., a binder resin. This pellet, approximately 300 μm in thickness, is a pellet of Example 2.

<Synthesis 2 of Fullerene Polyhydroxide Hydrogensulfate (Partial Ester)>

2 g of powders of $C_{60}/C_{70}$ fullerene mixture containing approximately 15% of $C_{70}$ were charged into 30 ml of fuming sulfuric acid and stirred at 57° C. for three days in a nitrogen atmosphere. The resulting reaction product was charged gradually into anhydrous diethyl ether and cooled in a glacial bath. It is noted that diethyl ether used at this time was a non-hydrated product. The resulting precipitates were fractionated on centrifugation, washed thrice with diethyl ether and twice with a 2:1 liquid mixture of diethyl ether and acetonitrile, and dried at 40° C. under reduced pressure. The resulting powders were subjected to FT-IR measurement. It was found that the IR spectrum of the powders substantially coincided with that of fullerene derivative, partially containing hydroxy groups and $OSO_3H$ groups, as indicated in the above reference material, such that the powders could be identified to be a target substance.

<Manufacture 2 of Flocculated Pellet of Fullerene Polyhydroxide Hydrogen Sulfate (Ester)>

80 mg of these powders of fullerene polyhydroxide hydrogensulfate ester were taken and pressed unidirectionally to form a circular pellet 15 mm in diameter. The pressing pressure at this time was approximately 7 ton/cm$^2$. It was found that these powders of fullerene polyhydroxide were superior in moldability, and could be readily formed into a pellet, despite the fact that they were completely free of e.g., a binder resin. This pellet, approximately 300 μm in thickness, is a pellet of Example 3.

<Manufacture of Flocculated Fullerene Pellet>

For comparison, 90 mg of fullerene powders used as a starting material for synthesis in the above Examples were taken and pressed unidirectionally to form a circular pellet 16 mm in diameter. The pressing pressure at this time was approximately 7 ton/cm$^2$. It was found that these powders of fullerene polyhydroxide were acceptable in moldability, and could be formed relatively readily into a pellet, despite the fact that they were completely free of e.g., a binder resin. This pellet, approximately 300 μm in thickness, is a pellet of Comparative Example 1.

<Measurement of Protonic Conductivity of Pellets Obtained in the Respective Examples and Comparative Example>

For measuring the conductivity of the pellets of the Examples 1 to 3 and the Comparative Example 1, each pellet was clinched on its both sides by aluminum discs 15 mm in diameter as in the pellet. An AC voltage, with an amplitude of 0.1V and a frequency ranging from 7 MHz to 0.01 Hz, was applied thereto for measuring the complex impedance at each frequency. The measurement was conducted in a dry atmosphere.

Figure 9A:
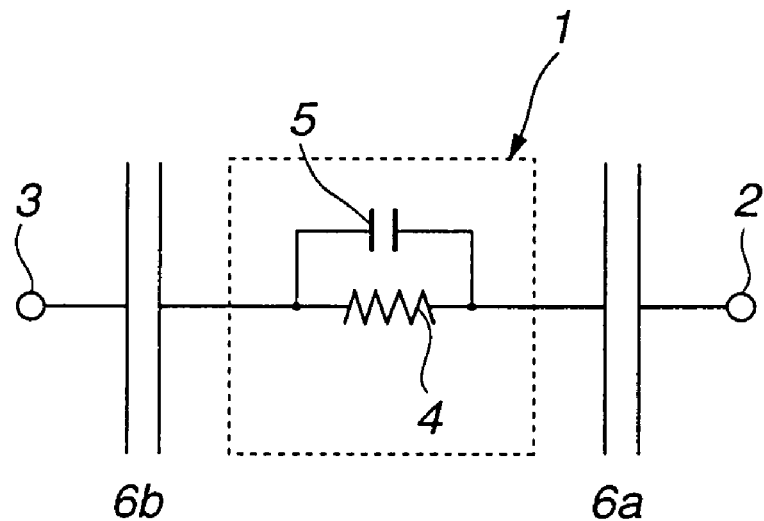
FIGS. 9A and 9B show equivalent circuits of the fuel cell according to an embodiment of the present invention.

In measuring the impedance, the proton conduction unit 1 of the proton conductor, formed by the pellet, electrically constitutes an equivalent circuit shown in FIG. 9A. Specifically, capacitors 6a, 6b are formed, along with the proton conduction unit 1 represented by a parallel circuit of a resistor 4 and a capacitor 5. Meanwhile, the capacitor 5 represents the delay effect in proton migration (phase delay in case of a high frequency), while the resistor 4 is a parameter for proton mobility.

It should be noted that the measured impedance Z is given by $Z=Re(Z)+i \cdot Im(Z)$. The frequency dependency of the proton conduction unit represented by the above equivalent circuit was checked.

Figure 9B:
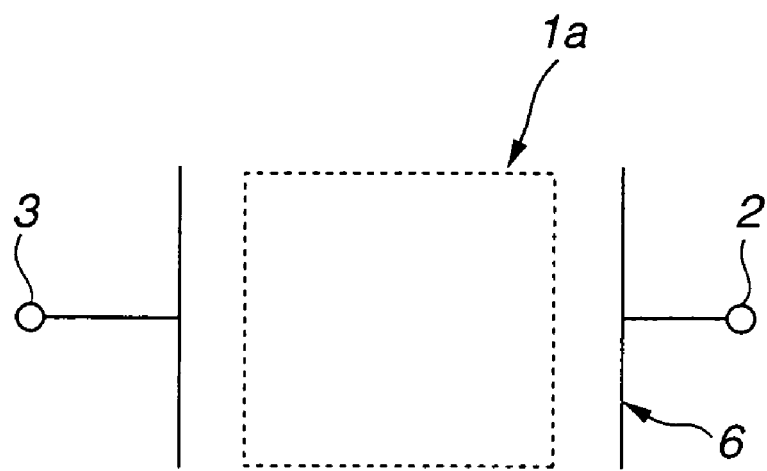

Meanwhile, FIG. 9B is an equivalent circuit for the case of employing routine fullerene molecules not indicating proton dissociative properties (Comparative Example as later explained).

Figure 10:
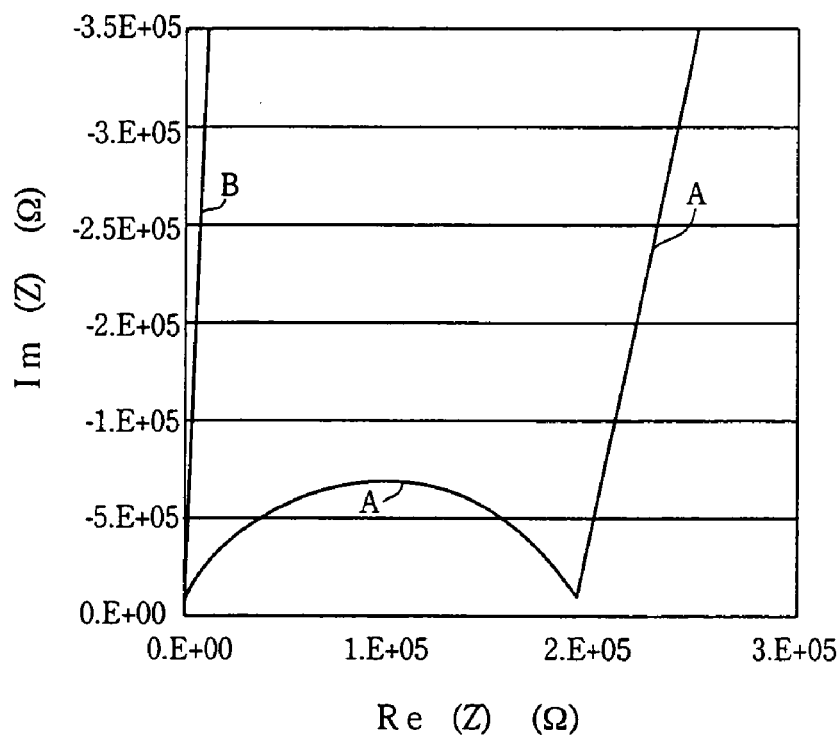
FIG. 10 shows the results of measurement of the complex impedance of a pellet used in a fuel cell according to an embodiment of the present invention.

FIG. 10 shows the results of impedance measurement for the pellet in Example 1 and Comparative Example 1.

These results indicate that, in the Comparative Example 1, the frequency response of the complex impedance is approximately the same as that of a capacitor taken alone, while no conduction behavior of charged particles (electrons or ions) of the flocculated mass of fullerene itself was observed, as shown at B in FIG. 10. In Example 1, an extremely neat sole semi-circular arc shape, somewhat flat, can be noticed in the high frequency area, as shown at A in FIG. 10. This indicates that some or other conduction behavior of charged particles is present in the pellet. Moreover, in a low frequency area, there may be observed a rapid rise in the imaginary portion of the impedance. This indicates that charged particles are subjected to blocking with respect to the aluminum electrode as the DC voltage is approached gradually. As a matter of course, since the charged particles on the side aluminum electrode are electrons, the charged particles within the pellet are not electrons nor holes but are other charged particles, that is ions. Judging from the structure of the fullerenol used, these charged particles cannot be other than protons.

The conductivity of these charged particles can be found from an X-axis intercept of the arc on the high frequency side. In the pellet of Example 1, this conductivity is calculated to be approximately $5 \times 10^{-6}$ S/cm. Similar measurements were made on the pellets of Examples 2 and 3 and impedance frequency response similar in overall shape to the case of Example 1 were obtained. However, the conductivity, as found from the X-axis intercept of the arcuate portion, was of different values, as shown in Table 1:

TABLE 1

Conductivity (25° C.) of proton conductor pellet in the present invention

| pellet types | conductivity (S/cm) |
|---|---|
| Ex. 1 | $5 \times 10^{-6}$ |
| Ex. 2 | $9 \times 10^{-4}$ |
| Ex. 3 | $2 \times 10^{-5}$ |

It may be seen that, when the $OSO_3H$ groups are substituted for hydroxy groups, the conductivity in the pellet tends to be increased. This is due to the fact that, with the $OSO_3H$ groups, electrical dissociation of hydrogen is more likely to occur than with the hydroxy groups. It could be found that, with the flocculated mass of this sort of the fullerene derivative, proton conduction is possible at room temperature in a dry atmosphere not only when one of the hydroxy groups and the OSO3H groups exist singly but also when both of the hydroxy groups and the OSO3H groups co-exist.

Figure 11:
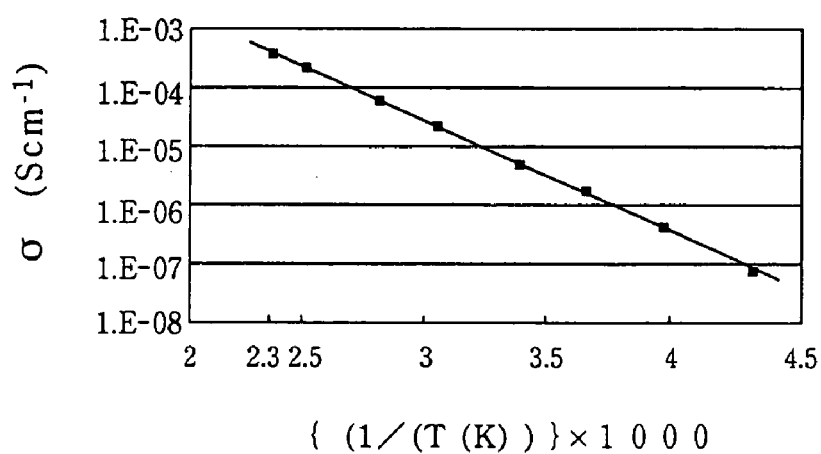
FIG. 11 shows the temperature dependency of the proton conductivity of the pellet used in a fuel cell according to an embodiment of the present invention.

Using the pellet of Example 1, the complex impedance was measured in a temperature range from 160° C. to −40° C. and temperature dependency of the conductivity as found from the arc on the high frequency side was checked. FIG. 11 shows the results by an Arrhenius type plot. It may be seen from this figure that conductivity is changed acutely straightly for a temperature range from 160° C. to −40° C. That is, this figure indicates that the sole ionic conduction mechanism is able to proceed in this temperature range. In short, it may be seen that a sole ionic conductivity mechanism can proceed in this temperature range. That is, with the proton conductor of an embodiment of the present invention, conduction becomes possible in a broad temperature range, in particular in an elevated temperature such as about 160° C. or a low temperature such as about −40° C.

<Manufacture A of Fullerene Polyhydroxide Pellet>

75 mg of powders of fullerene polyhydroxide, obtained by the aforementioned synthesis method, were taken and mixed with 25 mg of polyvinyl alcohol. The resulting product was further mixed with 0.5 ml of dimethylformamide and stirred thoroughly. This mixture was caused to flow into a circular mold 15 mm in diameter and the solvent was vaporized off under reduced pressure. The press working was then performed to produce a pellet 15 mm in diameter. This pellet was of a thickness of approximately 300 µm. This pellet is a pellet of Example 4.

<Synthesis 1A of Fullerene Polyhydroxide Hydrogen Sulfate (Full Ester)>

This synthesis was conducted by having reference to the above-mentioned reference material. 1 g of powders of fullerene polyhydroxide was charged into 60 ml of fuming sulfuric acid and stirred at room temperature for three days in a nitrogen atmosphere. The resulting reaction product was charged gradually into anhydrous diethyl ether and cooled in a glacial bath. The resulting precipitates were fractionated on centrifugation, washed thrice with diethyl ether and twice with a 2:1 liquid mixture of diethyl ether and acetonitrile and dried at 40° C. under reduced pressure. The resulting powders were subjected to FT-IR measurement. It was found that the IR spectrum of the powders substantially coincided with that of fullerene polyhydroxide, all hydroxy groups of which were replaced by hydrogen sulfate ester groups, as indicated in the above reference material, thus indicating that the powders were a target substance.

<Manufacture 1A of Fullerene Polyhydroxide Hydrogen Sulfate Ester Pellet>

75 mg of powders of fullerene polyhydroxide hydrogen sulfate (ester) were taken and mixed with 25 mg of polyvinyl alcohol. The resulting product was further mixed with 0.5 ml of dimethylformamide and stirred thoroughly. This mixture was caused to flow into a circular mold 15 mm in diameter and the solvent was vaporized off under reduced pressure. The press working was then performed to produce a pellet 15 mm in diameter. This pellet was of a thickness of approximately 300 µm. This pellet is a pellet of Example 5.

<Synthesis 2A of Fullerene Polyhydroxide Hydrogen Sulfate (Partial Ester)>

2 g of powders of $C_{60}/C_{70}$ fullerene mixture, containing approximately 15% of $C_{70}$, were charged into 30 ml of fuming sulfuric acid and stirred at 57° C. for three days in a nitrogen atmosphere. The resulting reaction product was charged gradually into anhydrous diethyl ether and cooled in a glacial bath. It is noted that diethyl ether used at this time was a non-hydrated product. The resulting precipitates were fractionated on centrifugation, washed thrice with diethyl ether and twice with a 2:1 liquid mixture of diethyl ether and acetonitrile and dried at 40° C. under reduced pressure. The resulting powders were subjected to FT-IR measurement. It was found that the IR spectrum of the powders substantially coincided with that of fullerene derivative, partially containing hydroxy groups and $OSO_3H$ groups, as indicated in the above reference material, thus indicating that the powders were a target substance.

<Manufacture 2A of Fullerene Polyhydroxide Hydrogen Sulfate Ester Pellet>

75 mg of powders of fullerene polyhydroxide, partially in the form of a hydrogen sulfate ester, were taken and mixed with 25 mg of polyvinyl alcohol. The resulting product was further mixed with 0.5 ml of dimethylformamide and stirred thoroughly. This mixture was caused to flow into a circular mold 15 mm in diameter and the solvent was vaporized off under reduced pressure. The press working was then performed to produce a pellet 15 mm in diameter. This pellet was of a thickness of approximately 300 µm. This pellet is a pellet of Example 6.

<Manufacture of Fullerene Pellet>

For comparison, 75 mg of fullerene powders used as a starting material for synthesis in the above Examples, were taken and mixed with 25 mg of powders of polyvinyl alcohol. The resulting mixture was added to with 0.5 ml of dimethylformamide and stirred thoroughly. The resulting mixture was caused to flow into a circular mold 15 mm in diameter and the solvent was vaporized off under reduced pressure. The resulting mass was pressed to form a circular pellet 15 mm in diameter. This pellet, approximately 300 µm in thickness, is a pellet of Comparative Example 2.

<Measurement of Protonic Conductivity of Pellets Obtained in the Respective Examples and Comparative Example>

For measuring the conductivity of the pellets of the Examples 4 to 6 and the Comparative Example 2, each pellet was clinched on its both sides by aluminum discs 15 mm in diameter as in the pellet. An AC voltage, with an amplitude of 0.1 V and a frequency ranging from 7 MHz to 0.01 Hz, was applied thereto for measuring the complex impedance at each frequency. The measurement was conducted in a dry atmosphere.

In measuring the impedance, the proton conduction unit 1 of the proton conductor, formed by the pellet, electrically constitutes an equivalent circuit shown in FIG. 9A. Specifically, capacitors 6 are formed between the first and second electrodes 2, 3, along with the proton conduction unit 1 represented by a resistor 4. Meanwhile, the capacitor 6 represent the delay effect in proton migration (phase delay in case of a high frequency), while the resistor 4 is a parameter for proton mobility. It is noted that the measured impedance Z is given by $Z=\text{Re}(Z)+i\cdot\text{Im}(Z)$. The frequency dependency of the proton conduction unit represented by the above equivalent circuit was checked. Meanwhile, FIG. 9B is an equivalent circuit for the case of employing routine fullerene molecules not indicating proton dissociative properties (Comparative Example as later explained).

Figure 12:
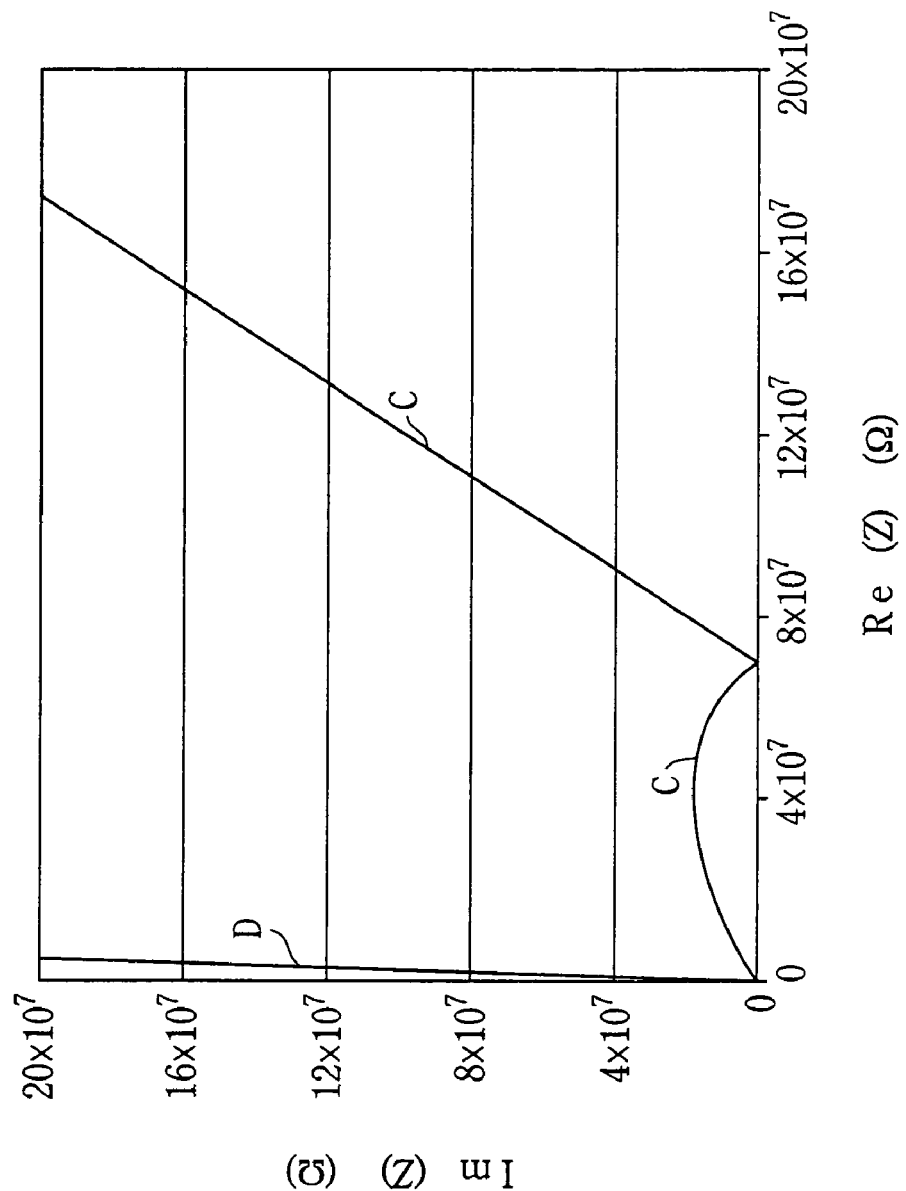
FIG. 12 shows the results of measurement of the complex impedance of a pellet used in a fuel cell according to an embodiment of the present invention.

FIG. 12 shows the results of impedance measurement for the pellet in Example 4 and Comparative Example 2.

These results indicate that, in the Comparative Example 2, the frequency response of the complex impedance is approximately the same as that of a capacitor, taken alone, while no conduction behavior of charged particles (electrons or ions) of the flocculated mass of fullerene itself was observed, as shown at D in FIG. 12. In Example 4, an extremely neat sole semi-circular arc shape, somewhat flat, can be noticed in the high frequency area, as shown at C in FIG. 12. This indicates that some or other conduction behavior of charged particles is present in the pellet. Moreover, in a low frequency area, there may be observed a rapid rise in the imaginary portion of the impedance. This indicates that charged particles are subjected to blocking with respect to the aluminum electrode as the DC voltage is approached gradually. As a matter of course, since the charged particles on the side aluminum electrode are electrons, the charged particles within the pellet are not electrons nor holes but other charged particles, that is ions. Judging from the structure of the fullerenol used, these charged particles cannot be other than protons.

The conductivity of these charged particles can be found from an X-axis intercept of the arc on the high frequency side. In the pellet of Example 4, this conductivity is calculated to be approximately $1 \times 10^{-6}$ S/cm. Similar measurements were made on the pellets of Examples 5, 6 and on the pellets of Examples 4 to 6 and impedance frequency response similar in overall shape to the case of Example 4 were obtained. However, the conductivity, as found from the X-axis intercept of the arcuate portion, was of different values, as shown in Table 2:

TABLE 2

Conductivity (25° C.) of proton conductor pellet in the present invention

| pellet types | conductivity (S/cm) |
|---|---|
| Ex. 4 | $1 \times 10^{-6}$ |
| Ex. 5 | $2 \times 10^{-4}$ |
| Ex. 6 | $6 \times 10^{-5}$ |

It may be seen that, when the $OSO_3H$ groups are substituted for hydroxy groups, the conductivity in the pellet tends to be increased. This is due to the fact that, with the $OSO_3H$ groups, electrical dissociation of hydrogen is more likely to occur than with the hydroxy groups. It could be found that, with the flocculated mass of this sort of the fullerene derivative, proton conduction is possible at room temperature in a dry atmosphere not only when one of the hydroxy groups and the $OSO_3H$ groups is present singly but also when both of the hydroxy groups and the OSO3H groups are present together.

Figure 13:
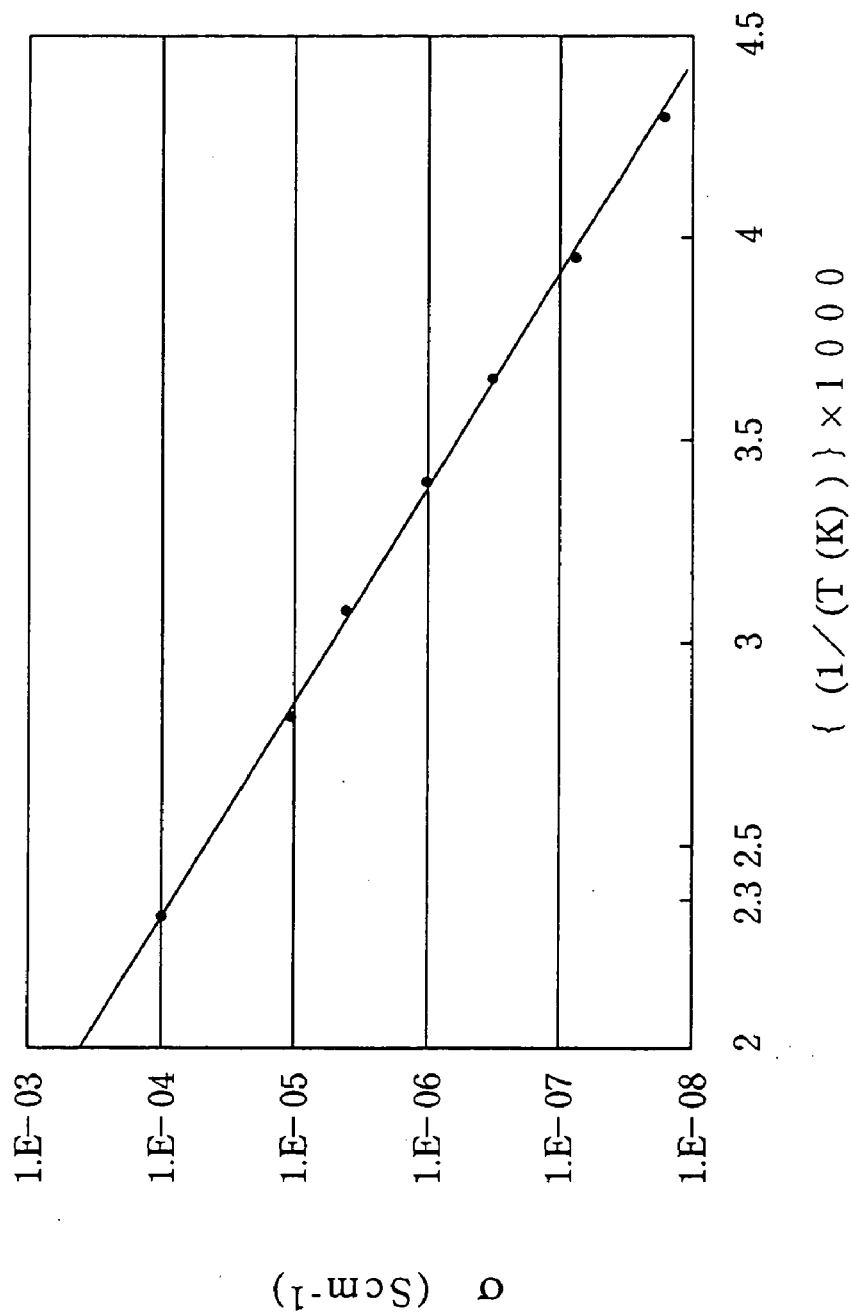
FIG. 13 shows temperature dependency of the proton conductivity of the pellet shown in FIG. 12.

Using the pellet of Example 4, the complex impedance was measured in a temperature range from 160° C. to −40° C. and temperature dependency of the conductivity as found from the arc on the high frequency side was checked. FIG. 13 shows the results by an Arrhenius type plot. It may be seen from this figure that conductivity is changed acutely straightly for a temperature range from 160° C. to −40° C. That is, this figure indicates that the sole ionic conduction mechanism is able to proceed in this temperature range. In short, it may be seen that a sole ionic conductivity mechanism can proceed in this temperature range. That is, with the proton conductor of the present invention, conduction becomes possible in a broad temperature range, in particular in an elevated temperature such as 160° C. or a low temperature such as −40° C.

<Preparation of Fuel Cell and Evaluation of its Performance>

A proton conductor was formed from a mixture of the fullerene polyhydroxide hydrogen sulfate ester used in Example 5 and the binder (polyvinyl alcohol). The mixing ratio of the fullerene polyhydroxide hydrogen sulfate ester, referred to below as FL, and polyvinyl alcohol, referred to below as PVA {PVA/(FL+PVA)} in unit of wt %, sometimes abbreviated to %, was changed to various values, fuel cells associated with these variable values were constructed as shown in FIG. 8. To the anode and cathode of each fuel cell were supplied hydrogen and oxide and, as each fuel cell was run in the constant current mode, measurements were made of output characteristics of each fuel cell.

Figure 14:
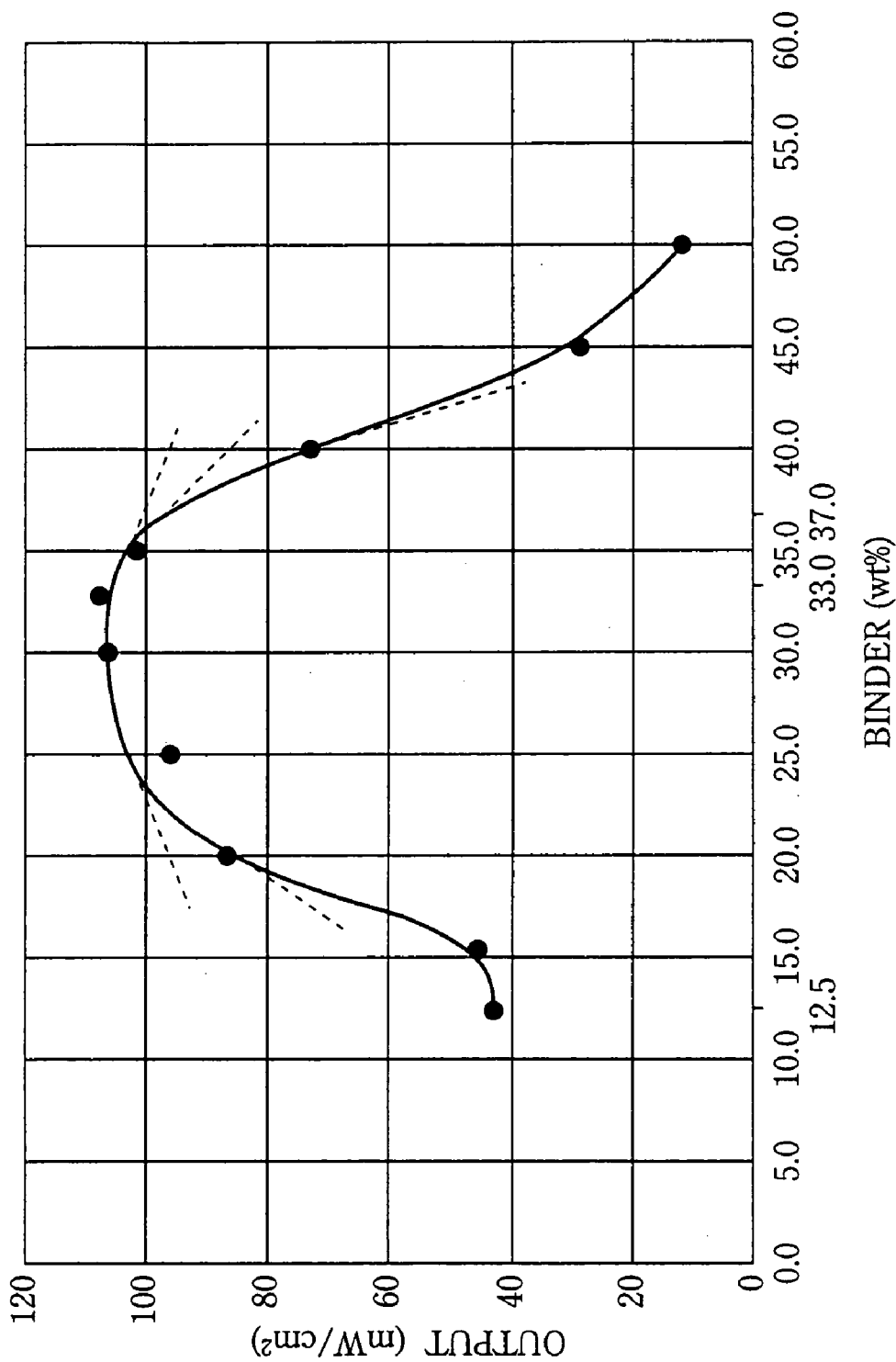
FIG. 14 is a graph showing output characteristics of the fuel cell in case of changing the ratio of the polyvinyl alcohol amount of the pellet shown in FIG. 12.

As a result, output characteristics proportionate to the PVA content in the proton conductor, with the output peak voltage of 400 mV, were obtained, as may be seen from FIG. 14.

Thus, it may be seen that a point of inflection is presented for the PVA content of about 20%, and that the output is decreased precipitously for the PVA content less than about 20%, while a high output is obtained for the PVA content exceeding about 20%. From these results, the PVA content should be of a value exceeding about 20%.

Since the point of inflection is presented at about 25%, the lower limit of the PVA content is desirably about 25%. On the other hand, the output starts to be decreased with about 33% as a peak point and a point of inflection is presented at about 37%. Since the output itself is liable to be lowered significantly beyond about 40%, the upper limit of the PVA content is preferably about 40% and more preferably about 37%.

Thus, from the results of FIG. 14, the PVA content should exceed 20% and is preferably 25%, with the upper limit value being preferably about 40%, more preferably about 37% and most preferably about 35%. The merit of this value of the PVA mixing ratio is apparent from data of voltage/current density dependency of the output, as may be indicated from FIGS. 15 and 16, which will be explained subsequently.

Figure 15:
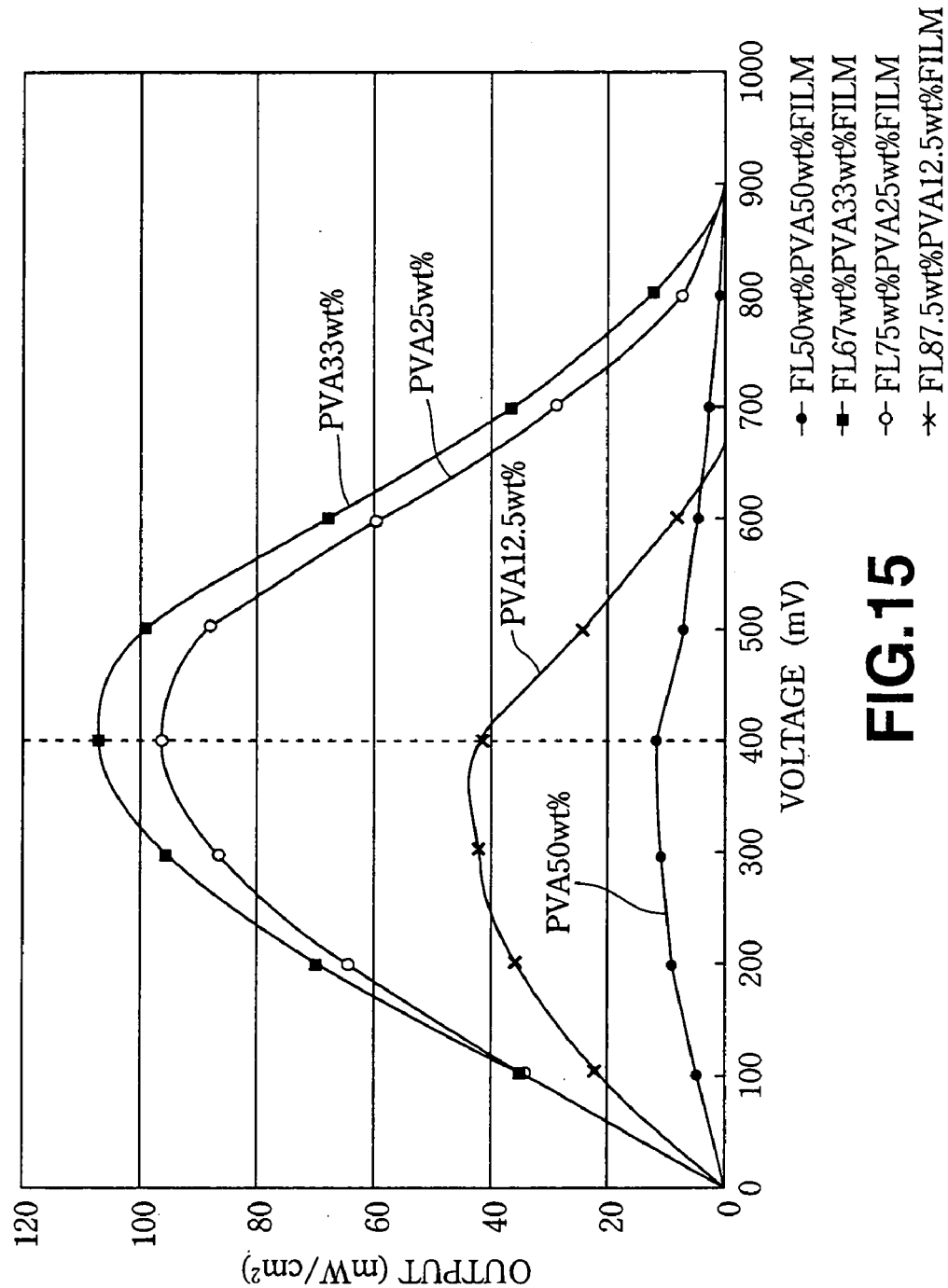
FIG. 15 is a graph showing the output against the voltage, and showing fullerenol dependency and polyvinyl alcohol dependency of the output of the fuel cell according to an embodiment of the present invention.
Figure 16:
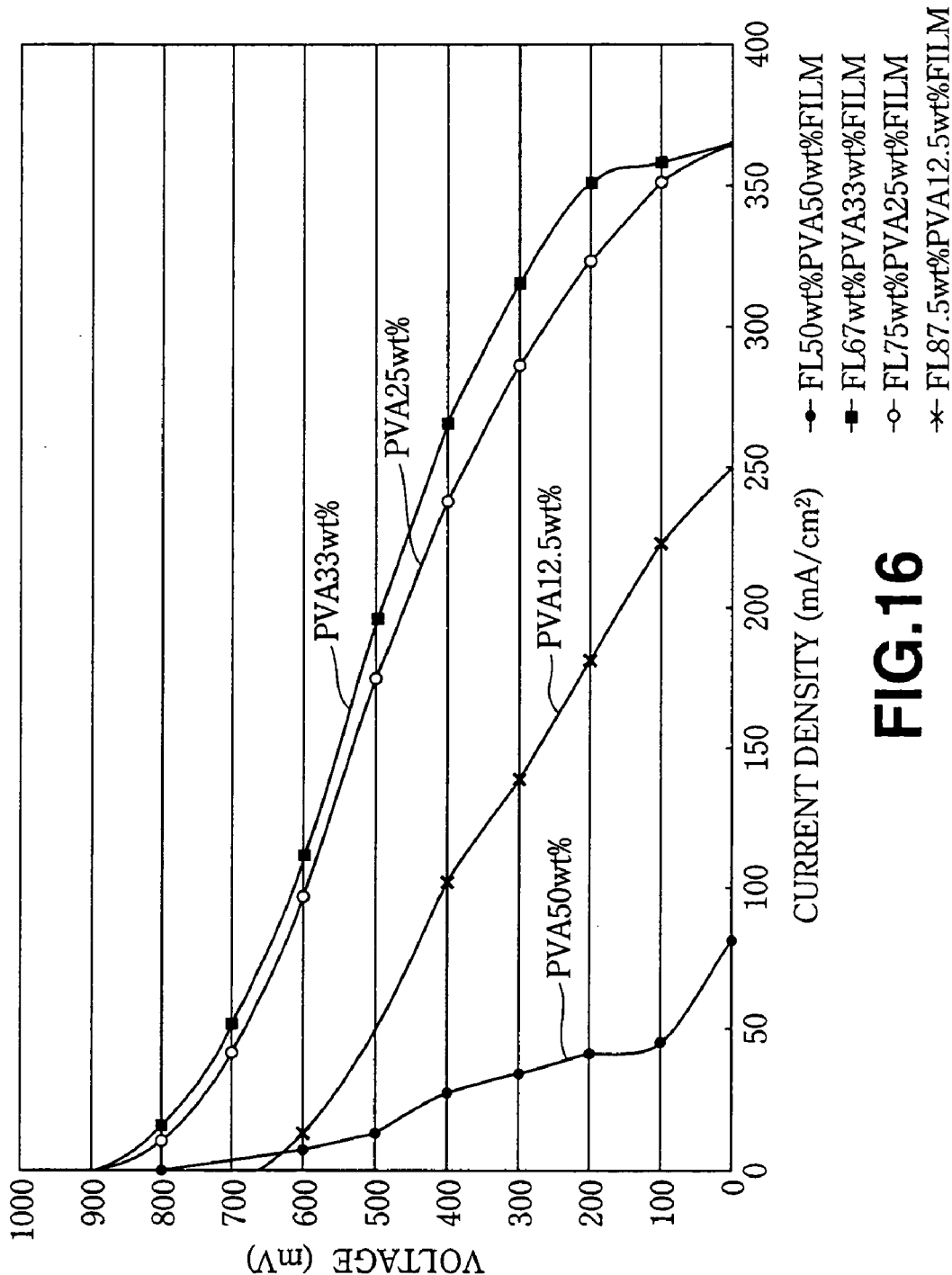
FIG. 16 is a graph showing the voltage as plotted against the current density, and showing fullerenol dependency and polyvinyl alcohol dependency of the output of the fuel cell according to an embodiment of the present invention.

FIGS. 15 and 16 indicate the FL dependency and PVA dependency, respectively, of the output for the lowest PVA content (12.5%), the highest PVA content (50%), the PVA content indicating the peak value (33%) and the PVA content for the inflection point (25%), in the fuel cell manufactured for conducting the above measurement. FIGS. 2 and 3 are graphs are a graph showing output/voltage characteristics and a graph showing voltage/current density characteristics, respectively.

That is, in the output/voltage characteristics of FIG. 15, output peak values occur for 400 mV. In particular, when the PVA content is 25% and 33%, the output increase and decrease degrees indicate sharp symmetry for voltage values lower and higher than 400 mV as a boundary value, with the output performance being kept up to 900 mV. These characteristics are similarly noticed in voltage/current density characteristics shown in FIG. 16. Thus, it may be demonstrated that a superior fuel cell may be realized by employing a proton conductor containing the fullerene derivative and polyvinyl alcohol in an amount of more than about 20 wt %.

EXAMPLE 1

A liquid dispersion was prepared by dispersing fullerenol in the form of a hydrogen sulfate ester in tetrahydrofuran in a weight ratio of 1:2.

The so produced liquid dispersion was coated on a carbon electrode, using a mask and a squeezee, and dried to vaporize tetrahydrofuran, as a solvent, to form a layer of fullerenol in the form of a hydrogen sulfate ester on a carbon electrode to a thickness of 10 µm.

Then, fullerenol in the form of a hydrogen sulfate ester and polyvinyl alcohol were mixed together at a weight ratio of 2:1 and dispersed or dissolved in a quantity of water equal to five times by weight as much as the total weight of fullerenol in the form of a hydrogen sulfate ester and polyvinyl alcohol to prepare a slurry. This slurry was then coated on the layer of fullerenol in the form of a hydrogen sulfate ester, using a mask and a squeezee. Then, water was vaporized off to form a proton conductor film, 12 µm in thickness, containing fullerenol in the form of a hydrogen sulfate ester and polyvinyl alcohol.

A heater was directly applied, under pressure, to plural laminated products, each comprised of carbon electrodes, a layer of fullerenol in the form of a hydrogen sulfate ester and a layer of polyvinyl alcohol, to heat the proton conductor film with variable heating temperature and heating time.

As the variable heating temperatures, 120° C., 150° C., 160° C., 180° C. and 200° C. were selected.

The laminated products, thus heated, were immersed in water and allowed to stand for one minute to conduct tests on water-proofness, in which the state of dissolution of the proton conductor film into water was observed with naked eyes.

Figure 17:
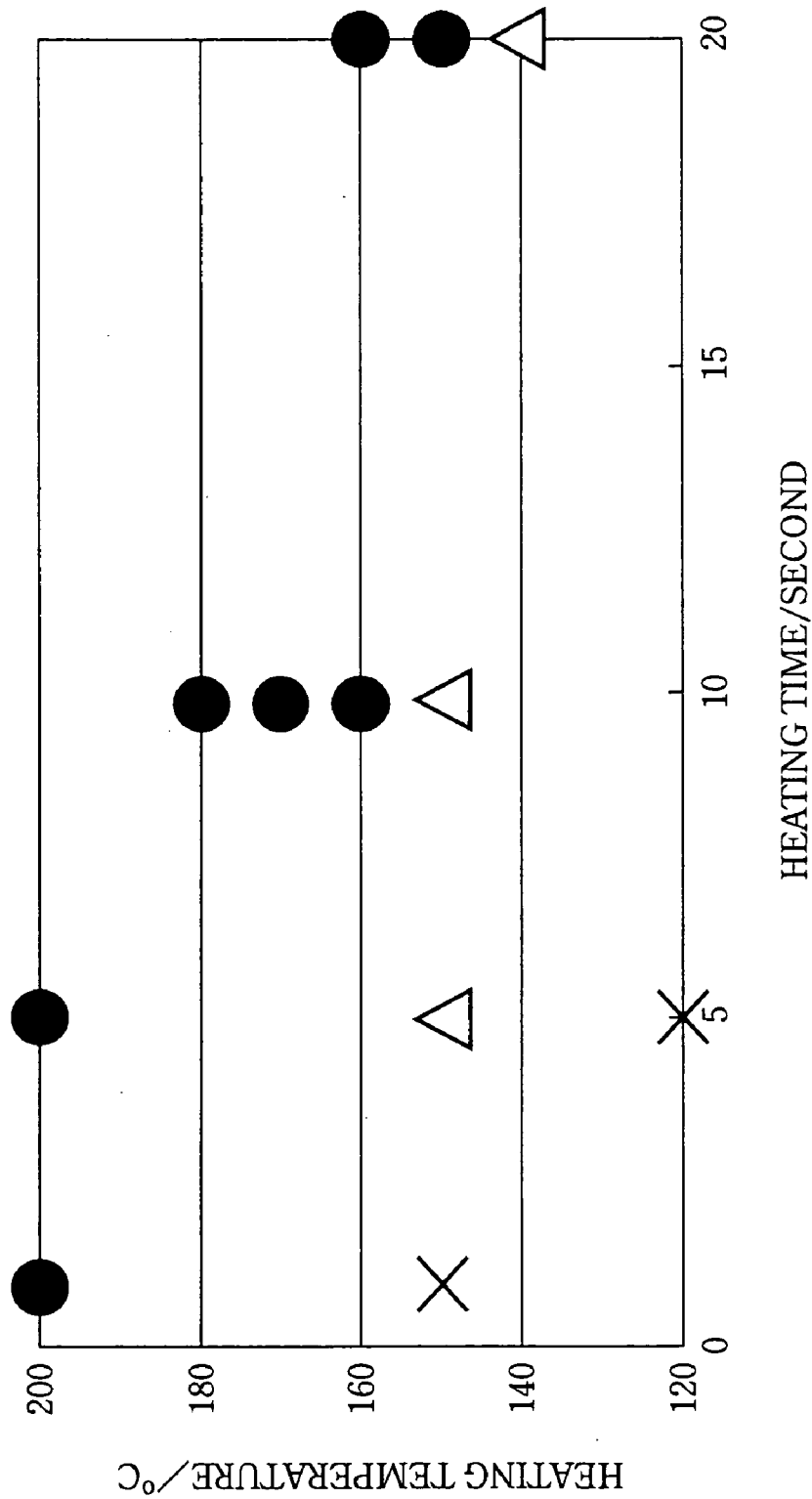
FIG. 17 is a graph showing test results of a water-proofing test in the Example 1 of the present invention.

The test results are shown in FIG. 17, in which x, Δ and ● indicate that the majority of the proton conductor film was found to be dissolved, that approximately one half of the proton conductor film was found to be dissolved and that 90% or more of the proton conductor film was left over without dissolution, respectively.

It is seen from FIG. 17 that, when the proton conductor film was heated at 200° C., 180° C. or 160° C., water-proofness of the proton conductor film was improved appreciably within the processing time of 10 seconds, whereas, if the proton conductor film was heated at 150° C., the water-proofness of the proton conductor film could not be improved in a desired manner unless heating is continued for 20 seconds or longer.

On the other hand, when the proton conductor film was heated at a temperature exceeding 200° C., polyvinyl alcohol was seen to undergo transmutation.

Thus, it may be seen from FIG. 17 that the proton conductor film needs to be heated at a temperature of from about 150° C. to about 200° C., and that preferably the proton conductor film is to be heated at a temperature from about 160° C. to about 200° C.

EXAMPLE 2

Then, fullerenol in the form of a hydrogen sulfate ester and polyvinyl alcohol were mixed together at a weight ratio of 2:1 and dispersed or dissolved in a quantity of water equal to five times by weight as much as the total weight of fullerenol in the form of a hydrogen sulfate ester and polyvinyl alcohol to prepare a slurry. This slurry was then coated on the layer of fullerenol in the form of a hydrogen sulfate ester, using a mask and a squeezee. Then, water was vaporized off to form a proton conductor film, 12 µm in thickness, containing fullerenol in the form of a hydrogen sulfate ester and polyvinyl alcohol.

A liquid mixture was prepared by dispersing or dissolving a mixture of fullerenol in the form of a hydrogen sulfate ester and polyvinyl alcohol in a weight ratio of 2:1 in a quantity of water equal to five times as much as the total weight of fullerenol in the form of a hydrogen sulfate ester and polyvinyl alcohol. This liquid mixture was coated on one surface of the so formed proton conductor film by a gravure printing method and dried to vaporize water off to form a layer of the mixture of fullerenol in the form of a hydrogen sulfate ester and polyvinyl alcohol to a thickness of 1 µm.

A heater was directly applied, under pressure, to the so produced laminated proton conductor to effect heating at 180° C. for ten seconds.

A hydrogen gas then was supplied, at a pressure of 0.03 MPa, from the side of the laminated proton conductor not carrying the layer of the mixture of the fullerenol in the form of a hydrogen sulfate ester and polyvinyl alcohol, and measurements were made of temporal changes in the hydrogen gas concentration on the side of the laminated proton conductor carrying the layer of the mixture of the fullerenol in the form of a hydrogen sulfate ester and polyvinyl alcohol.

Figure 18:
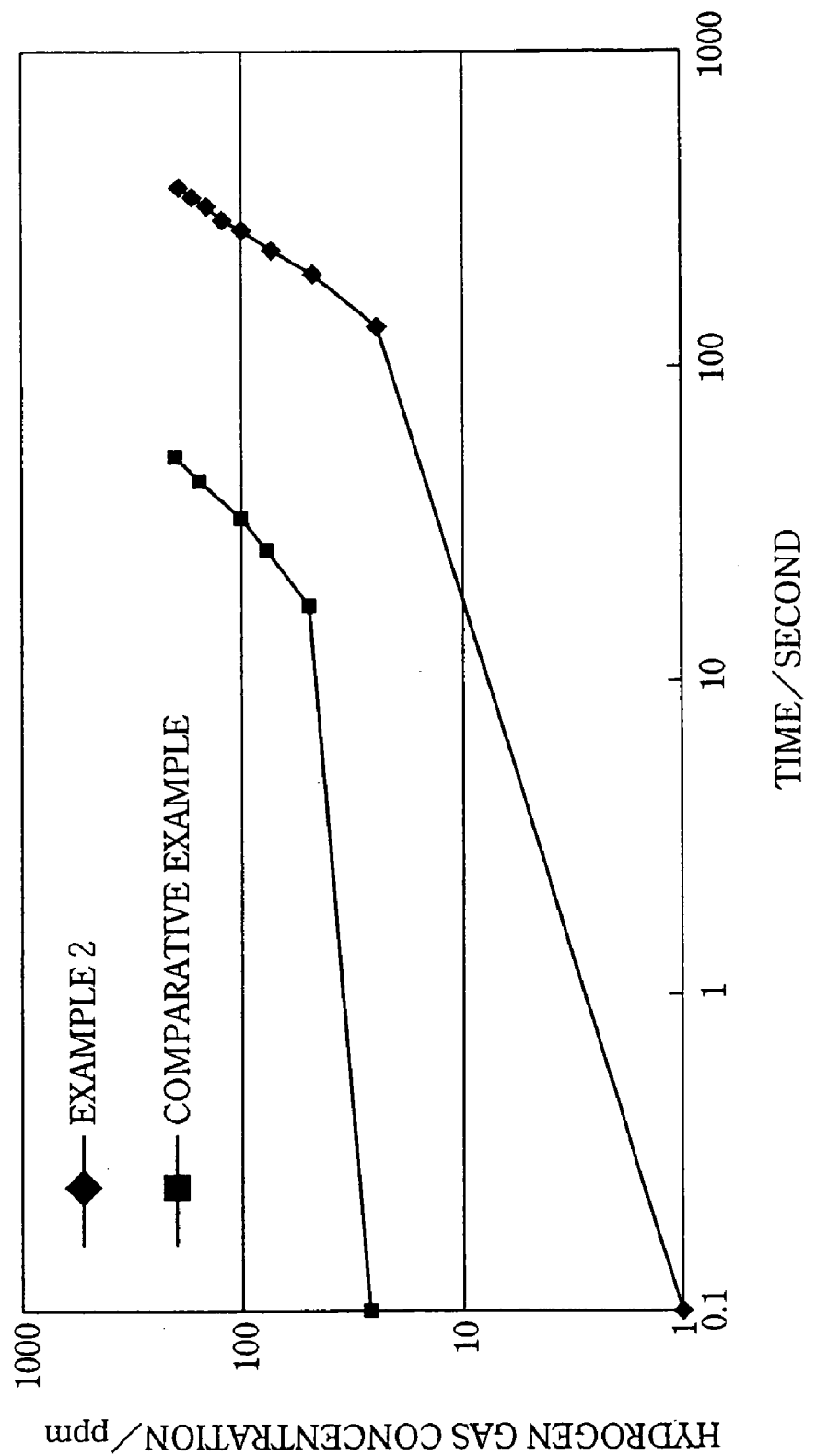
FIG. 18 is a graph showing time changes of the hydrogen gas concentration in the Example 2 and in the Comparative Example of the present invention.

The measured results are shown in FIG. 18.

COMPARATIVE EXAMPLE

In the same way as in Example 2, a hydrogen gas was supplied at a pressure of 0.03 MPa from one side of the laminated proton conductor and measurements were made of temporal changes on the opposite side of the hydrogen gas concentration.

The measured results are shown in FIG. 18.

It may be seen from FIG. 18 that the proton conductor film of Example 2, carrying the layer of the mixture of the fullerenol in the form of a hydrogen sulfate ester and polyvinyl alcohol on its one surface exhibits hydrogen gas intercepting performance which is superior to that of the proton conductor film of Comparative Example not carrying the layer of the mixture of the fullerenol in the form of a hydrogen sulfate ester and polyvinyl alcohol.

A hydrogen gas then was supplied, at a pressure of 0.03 MPa, from the side of the proton conductor film of Example 2 carrying the layer of the mixture of the fullerenol in the form of a hydrogen sulfate ester and polyvinyl alcohol, and measurements were made of temporal changes in the hydrogen gas concentration on the side of the proton conductor film carrying the layer of the mixture of the fullerenol in the form of a hydrogen sulfate ester and polyvinyl alcohol. No significant difference was noticed.

The present invention is not to be limited to the embodiments, as now explained, but may be suitably modified without departing from the scope of the invention as defined in the claims.

The proton conductor manufactured by the process of the present invention in an embodiment includes a fullerene derivative including a proton dissociative group introduced to at least one carbon atom of the fullerene molecule, and a polyvinyl alcohol in an amount of more than about 20 wt %, and hence demonstrates high protonic conductivity even in a dry state in a temperature range inclusive of the room temperature. Moreover, proton conductor exhibits film-forming properties, ascribable to polyvinyl alcohol amount, and hence is improved in strength, while prohibiting gas transmission. Thus, the proton conductor can be used as a thin film exhibiting high protonic conductivity.

Moreover, the proton conductor can be used for an electro-chemical device without being atmosphere limited so that it is possible to realize the small size and simplified structure of the system.

According to the present invention, there may be provided a proton conductor film for a fuel cell having a high hydrogen gas intercepting performance without the risk of lowering the cell output, and a fuel cell which is able to realize a high fuel output.

By employing this proton conductor for an electro-chemical device, there is imposed no atmosphere constraint and hence the system can be reduced in size and simplified in structure.

The present invention moreover renders it possible to provide a proton conductor film in which there is no risk of dissolution even though water is yielded by electrode reaction and which exhibits superior hydrogen gas intercepting performance, a method for preparation of the proton conductor film, a high output fuel cell having the proton conductor film in which there is no risk of dissolution even though water is yielded by electrode reaction and which exhibits superior hydrogen gas intercepting performance, and a method for preparation of the fuel cell.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A proton conductor comprising:
   a fullerene derivative including a fullerene molecule and a proton dissociative group introduced to at least one carbon atom of the fullerene molecule; and
   a polyvinyl alcohol in an amount of more than about 20 wt %.

2. The proton conductor according to claim 1 wherein the amount of the polyvinyl alcohol is about 40 wt % or less.

3. The proton conductor according to claim 1 wherein the proton dissociative groups are —XH, where X is a bivalent atom or atom group thereof and wherein H is a hydrogen atom.

4. The proton conductor according to claim 1 wherein the proton dissociative groups are —OH or —YOH, where Y is a bivalent atom or atom group thereof and wherein H is a hydrogen atom.

5. The proton conductor according to claim 4 wherein the proton dissociative groups are selected from the group consisting of —OH, —OSO$_3$H, —COOH, —SO$_3$H, —OPO(OH)$_2$ and combinations thereof.

6. The proton conductor according to claim 1 wherein one or more proton dissociative groups and electrophilic groups are introduced into the fullerene molecules.

7. The proton conductor according to claim 6 wherein the electrophilic groups at least include a nitro group, a carbonyl group, a carboxylic group, a nitrile group, a halogenated alkyl group, a halogen atom and combinations thereof.

8. The proton conductor according to claim 1 wherein the fullerene molecule includes spheroidal carbon cluster molecules that are represented by the formula $C_m$, where m is a natural number such that the fullerene molecules are configured in a spherical structure.

9. The proton conductor according to claim 1 wherein the proton conductor is formed to a thin film having a thickness of about 300 µm or less.

10. A method for producing a proton conductor comprising:
    introducing proton dissociative groups to carbon atoms of fullerene molecules to produce a fullerene derivative;
    mixing the fullerene derivative with about 20 wt % or more of a polyvinyl alcohol; and
    forming the fullerene derivative and the polyvinyl alcohol mixture into a thin film.

11. The method according to claim 10 wherein the polyvinyl alcohol is mixed in an amount of about 40 wt % or less.

12. The method according to claim 10 wherein the proton dissociative groups are —XH, where X is a bivalent atom or atom group thereof and wherein H is a hydrogen atom.

13. The method according to claim 10 wherein the proton dissociative groups are selected from the group consisting of —OH, —YOH, and combination thereof where Y is a bivalent atom or atom group thereof and wherein H is a hydrogen atom.

14. The method according to claim 13 wherein the proton dissociative groups are selected from the group consisting of —OH, —OSO$_3$H, —COOH, —SO$_3$H, —OPO(OH)$_2$ and combinations thereof.

15. The method according to claim 10 wherein one or more proton dissociative groups and electrophilic groups are introduced into the fullerene molecules.

16. The method according to claim 15 wherein the electrophilic groups are selected from the group consisting of a nitro group, a carbonyl group, a carboxylic group, a nitrile group, a halogenated alkyl group, a halogen atom and combinations thereof.

17. The method according to claim 10 wherein the fullerene molecules are spheroidal carbon cluster molecules represented by $C_m$, where m is a natural number with which the fullerene molecules can constitute a spherical structure.

18. The method according to claim 10 wherein the proton conductor is formed into a thin film having a thickness of about 300 µm or less.

19. An electro-chemical device comprising:
    a first electrode;
    a second electrode; and
    a proton conductor between the first electrode and the second electrode;
    wherein the proton conductor comprises a fullerene derivative including a fullerene molecule and a proton dissociative group introduced to at least one carbon atom of the fullerene molecule, and polyvinyl alcohol in an amount of more than about 20 wt %.

20. The electro-chemical device according to claim 19 wherein the amount of polyvinyl alcohol is about 40 wt % or less.

21. The electro-chemical device according to claim 19 wherein the proton dissociative groups are —XH, where X is a bivalent atom or atom group thereof and wherein H is a hydrogen atom.

22. The electro-chemical device according to claim 19 wherein the proton dissociative groups are selected from the group consisting of —OH, —YOH and combinations thereof where Y is a bivalent atom or atom group thereof and wherein H is a hydrogen atom.

23. The electro-chemical device according to claim 22 wherein the proton dissociative groups are selected from the group consisting of —OH, —OSO$_3$H, —COOH, —SO$_3$H, —OPO(OH)$_2$ and combinations thereof.

24. The electro-chemical device according to claim 19 wherein one or more proton dissociative groups and electrophilic groups are introduced into the fullerene molecules.

25. The electro-chemical device according to claim 24 wherein the electrophilic groups at least include a nitro group, a carbonyl group, a carboxylic group, a nitrile group, a halogenated alkyl group, a halogen atom and combinations thereof.

26. The electro-chemical device according to claim 19 wherein the fullerene molecules are spheroidal carbon cluster molecules represented by $C_m$, where m is a natural number allowing the fullerene molecules to constitute a spherical structure.

27. The electro-chemical device according to claim 19 wherein the proton conductor is formed into a thin film having a thickness of about 300 μm or less.

28. The electro-chemical device according to claim 19 wherein the device is configured as a fuel cell.

29. The electro-chemical device according to claim 19 wherein the device is configured as a hydrogen-air cell.

30. The electro-chemical device according to claim 19 wherein at least one of the first and second electrodes is a gas electrode.

31. The electro-chemical device according to claim 19 wherein at least one of the first and second electrodes is an active material electrode.

* * * * *